(12) United States Patent
Lee

(10) Patent No.: US 11,995,266 B2
(45) Date of Patent: May 28, 2024

(54) OBJECT LOCATION DETECTION DEVICE

(71) Applicant: Sung Ho Lee, Seogwipo-si (KR)

(72) Inventor: Sung Ho Lee, Seogwipo-si (KR)

(73) Assignee: Sung Ho Lee, Seogwipo-si (KR)

( * ) Notice: Subject to any disclaimer, the term of this patent is extended or adjusted under 35 U.S.C. 154(b) by 0 days.

(21) Appl. No.: 18/369,187

(22) Filed: Sep. 17, 2023

(65) Prior Publication Data
US 2024/0094847 A1    Mar. 21, 2024

(30) Foreign Application Priority Data
Sep. 17, 2022    (KR) .......................... 10-2022-0117500

(51) Int. Cl.
*G06F 3/041*    (2006.01)
*G06F 3/044*    (2006.01)

(52) U.S. Cl.
CPC .... *G06F 3/041661* (2019.05); *G06F 3/04164* (2019.05); *G06F 3/044* (2013.01)

(58) Field of Classification Search
CPC . G06F 3/041661; G06F 3/04164; G06F 3/044
See application file for complete search history.

(56) References Cited

U.S. PATENT DOCUMENTS

2021/0191550 A1*  6/2021  Wang ................... G06F 3/0446
2022/0308730 A1*  9/2022  Lee ..................... G06F 3/04166

FOREIGN PATENT DOCUMENTS

| KR | 10-2009-0050988 A | 5/2009 |
| KR | 10-2014-0120504 A | 10/2014 |
| KR | 10-1740269 B1 | 6/2017 |

OTHER PUBLICATIONS

KIPO, Decision to Grant a Patent, Korean Patent Application No. 10-2022-0117500, dated Oct. 24, 2023.

* cited by examiner

*Primary Examiner* — Peter D McLoone
(74) *Attorney, Agent, or Firm* — Nicholas Park

(57) ABSTRACT

The present invention relates to a method of configuring a sensor pattern that linearly detects touch signals based on changes in the active area when a pen touches the ODA that constitutes the object detection device of the present invention installed on the conductive surface. It also pertains to a method of constructing a sensor pattern that minimizes moiré interference with the display device. As a result, the readability of pen-written characters is enhanced, and visibility is improved due to moiré avoidance.

24 Claims, 22 Drawing Sheets

FIG. 4

| Position | Area of third configuration ODA | | Active Area of ODA | | Average of Area |
|---|---|---|---|---|---|
| | @Row4 | @Row3 | @Row4 | @Row3 | |
| ODA3L-1 | 10% | 80% | 90% | 20% | 55% |
| ODA3L-2 | 11% | 79% | 89% | 21% | 55% |
| ODA3L-3 | 12% | 78% | 88% | 22% | 55% |
| ODA3L-4 | 13% | 77% | 87% | 23% | 55% |
| ODA3L-5 | 14% | 76% | 86% | 24% | 55% |
| ODA3L-6 | 15% | 75% | 85% | 25% | 55% |
| ODA3L-7 | 16% | 74% | 84% | 26% | 55% |
| ... | ... | ... | ... | ... | ... |
| ODA3L-14 | 23% | 67% | 77% | 33% | 55% |
| ..... | ..... | ..... | ..... | ..... | ..... |

| Position | Area of third configuration ODA | | Active Area of ODA | | Average of Area |
|---|---|---|---|---|---|
| | @Row4 | @Row5 | @Row4 | @Row5 | |
| ODA3S-1 | 10% | 80% | 90% | 20% | 55% |
| ODA3S-2 | 11% | 79% | 89% | 21% | 55% |
| ODA3S-3 | 12% | 78% | 88% | 22% | 55% |
| ODA3S-4 | 13% | 77% | 87% | 23% | 55% |
| ODA3S-5 | 14% | 76% | 86% | 24% | 55% |
| ODA3S-6 | 15% | 75% | 85% | 25% | 55% |
| ODA3S-7 | 16% | 74% | 84% | 26% | 55% |
| ... | ... | ... | ... | ... | ... |
| ODA3S-14 | 23% | 67% | 77% | 33% | 55% |
| ..... | ..... | ..... | ..... | ..... | ..... |

OBJECT LOCATION DETECTION DEVICE

CROSS-REFERENCE TO RELATED APPLICATION

This application claims priority to and the benefit of Korean Patent Application No. 10-2022-0117500 filed in the Korean Intellectual Property Office on Sep. 17, 2022, the entire contents of which are incorporated herein by reference.

BACKGROUND

Technical Field

This invention relates to a touch panel that detects touch inputs using the capacitive method by objects such as fingers or pens. More specifically, it concerns the structure of touch sensors to effectively determine the location of the object when touched.

Background Art

In the past, mechanical buttons were used to dial phone numbers on mobile phones. However, recently, the input device has transitioned from mechanical to electronic, where just lightly touching the display device of the mobile phone with a finger can input phone numbers. An example of such an electronic input device is the capacitive type touch input device. This device detects changes in capacitance size when an object like a finger or pen approaches or touches the touch sensor, which is the object detection area on the surface of the display device, and considers the input at that location as valid, similar to pressing a mechanical button.

With the recent proliferation of tablets, the use of touch pens has expanded significantly. Since the tip of a touch pen is typically about 1-2 mm in diameter, touch sensors must be narrowly formed to recognize a touch pen, which is narrower than a finger.

FIG. 1 shows an embodiment of the object detection device of this invention. The basic components of the object detection device are the Object Detection Area (ODA 100) and Touch IC 300. In FIG. 1, the object detection area consists of 8 rows and 10 columns. This embodiment in FIG. 1 is just an example for the convenience of drawing, and in reality, the object detection device of this invention attached to the display device can be displayed in various numbers of rows and columns depending on the size and purpose of use.

Touch IC 300 refers to a device that detects the presence and location of touch based on the voltage form of touch signals collected through the ODA signal line 200. It is a semiconductor IC that controls all processes of touch detection in the ODA. Touch IC 300 includes various circuitries such as ADC, DAC, multiplexer, power unit, memory, differential amplifier, etc. It may also include a logic unit or CPU that controls the touch process.

In Column 1, 8 ODAs are located, including Row8 ODA near Touch IC 300 and Row1 ODA at a far distance. Any ODA is distinguished as a Sensing ODA or Driving ODA based on its operation method.

When a touch occurs due to an object in the Sensing ODA, the voltage change occurring in the Sensing ODA is detected by connecting the Sensing ODA signal line connected to the Sensing ODA to the Sensing Part inside Touch IC 300. Also, the driving ODA signal line connected to the Driving ODA is connected to the Driving Part inside Touch IC 300, and a certain driving voltage is applied.

In the ODA column, ODAs are sequentially divided into one sensing ODA and one or more driving ODAs. In FIG. 1, there are 10 ODA columns, so there are 10 sensing ODAs. The driving ODA is an ODA adjacent to the sensing ODA where a driving voltage is applied. In one embodiment, if the Row4 ODA in any ODA column is selected as the sensing ODA, multiple driving ODAs, such as Row3/Row2 and Row5/Row6 ODAs adjacent to the Row4 ODA in the same ODA column, can be selected both above and below. Alternatively, a single driving ODA, such as Row3 or Row5, can be selected both above and below.

Touch IC 300 sequentially selects the Sensing ODA and Driving ODA from the ODA column by time-division and processes touch sensing.

In an ODA column, one sensing ODA is selected, and for effective processing, it's preferable that the sensing ODA selected in each ODA column is located in the same row. For instance, in FIG. 1, 10 ODAs belonging to Row1 are selected as sensing ODAs. After processing is completed for them, 10 ODAs belonging to Row2 are selected as sensing ODAs. This continues sequentially until the ODAs in the last row, Row8, are processed. If an ODA in Row1 is selected as a sensing ODA, then the neighboring Row2 (or even Row3) operates as a driving ODA. Similarly, if Row2 ODA is selected as a sensing ODA, then Row1 and Row3 (or even Row4) are selected as driving ODAs. In the same manner, if 10 ODAs in Row3 are selected as sensing ODAs, then the neighboring Row2 ODA (or even Row1 ODA) and Row4 ODA (or even Row5 ODA) are selected as driving ODAs, and an AC voltage of a certain magnitude is applied.

When an alternating voltage is applied to the driving ODA, circuit-wise, it's equivalent to applying a driving voltage to the inter-line capacitance formed between the sensing ODA signal line and the driving ODA signal line. This causes a charge-sharing phenomenon between the parasitic capacitance formed on the sensing ODA and its signal line (for instance, the common electrode capacitance and the parasitic capacitance formed adjacent to the sensing ODA within the Touch IC) and the inter-line capacitance. The Touch IC determines the presence of touch based on the voltage detected on the sensing ODA signal line due to this charge-sharing.

In FIG. 1, one ODA column consists of 8 ODAs, and the ODA signal lines 200 connected to the ODA form a bundle of signal lines called the Signal Line Harness (SLH). As object move from a far distant row to a closer row, the number of ODA signal lines increases, so the width of the SLH widens. Since the example in FIG. 1 consists of 10 ODA columns, 10 SLHs are formed.

In this specification, columns consisting of multiple ODAs, from Column1 to Column10, are defined as "ODA columns". In the example of FIG. 1, the ODA signal lines 200 bound to the ODA column are exemplified as being located in a single path to the right of the ODA column, but they can also be arranged in both directions, left and right. For instance, the signal lines 20) of odd-numbered ODAs can be placed on the left of the ODA column, and the signal lines 200 of even-numbered ODAs can be placed on the right.

Meanwhile, the direction perpendicular to the ODA column is defined as a row. Also, based on the Touch IC 300, one side of the ODA placed in the vertical direction is defined as the long side, and the side perpendicular to it is defined as the short side. In the example of FIG. 1, all ODAs have the same length for the long side. However, as the SLH becomes thicker towards the bottom, the length of the short side of the ODA decreases as object move downward.

In the embodiment of the object detection device in FIG. 1, to precisely detect the touch coordinates of a pen tip, which has a smaller touch area compared to a finger, it's preferable for the lengths of the long and short sides of the ODA to be shorter, meaning the area of the ODA should be smaller. This implies that multiple ODAs should be installed in the object detection device of the present invention. If multiple ODAs are installed, the number of ODAs in the ODA column increases, which in turn increases the width of the SLH, limiting the number of ODAs that can be added. As the number of ODAs increases, the area of the Touch IC 300 where the ODA signal line 200 enters also increases, raising the cost and making commercialization challenging.

One way to improve the location detection resolution of the pen without increasing the number of ODAs is to minimize the length of the short side of the ODA and arrange the ODAs in a diamond shape in the same ODA column, intersecting with neighboring ODAs above and below. The touch position of the pen can be determined based on the area difference as the pen moves in the intersection area.

Referring to paragraph of Korean Patent Registration No. 10-1740269 (Application No. 10-2015-0095747, hereinafter referred to as Cited Invention 1) filed and registered by the present applicant, it states:

"Each column of the touch panel is formed by repeatedly arranging a shape where the first pattern of 200-1 and the first pattern of 200-2 are interlocked with each other in a state where their phases are reversed by 180 degrees, as shown in FIG. 2a."

Also, paragraphs to of the same patent state:

"In FIG. 2b, each first pattern is shown to be formed by connecting 2.5ea second patterns, but the number of second patterns forming the first pattern varies, such as 3ea, 3.5ea, 4ea, or 4.5ea, depending on the resolution. As mentioned above, the shape of the second pattern, which is the basic pattern forming the first pattern, is a diamond shape."

Referring to FIG. 2 of Cited Invention 1, the first pattern of Cited Invention 1 is composed of multiple second patterns in which diamond shapes are repeatedly arranged. These are interlocked with each other in a state where their phases are reversed by 180 degrees. The advantage of this arrangement, as described in paragraph of Cited Invention 1, is that "in the present invention, when composed of a diamond shape, the advantage is that touch location detection can be more easily performed due to the area difference between the 200-1 pattern and the 200-2 pattern, as shown in circle (250)." In other words, assuming the circle 250 in FIG. 2 is a touch pen, it is possible to determine the vertical position of the touch pen based on the area occupancy rate difference caused by the touch pen between the upper pattern 200-1 and the lower pattern 200-2.

Meanwhile, referring to paragraphs to of Cited Invention 1, the following is stated:

"[0225] The second pattern shown in FIG. 2 has an overall diamond shape. However, this diamond shape is formed by connecting rectangles that gradually widen and rectangles that gradually narrow.

[0226] The second pattern 240-5 in FIG. 12 is formed by arranging rectangles of the first area 1220, the second area 1230, and the third area 1240 that widen in sequence.

[0227] The increasing areas where the width of the rectangle widens will be arranged up to the maximum width point of the two opposite vertices of the diamond shape, and from the maximum width point, multiple decreasing areas where the width of the rectangle narrows will be repeatedly arranged.

[0228] The second pattern 240-2 in FIG. 12 shows that the width of the rectangle gradually narrows from the first area 1250 to the second area 1260 and the third area 1270."

Referring to the description in paragraphs to of Cited Invention 1, the second pattern with a diamond shape is a polygon formed by connecting rectangles of different areas. In FIG. 12 of Cited Invention 1, the first area (1220, 1250), the second area (1230, 1260), and the third area (1240, 1270), which are composed of continuously connected rectangles with increasing or decreasing areas (specifically, only the length of the short side changes), have the same area for two opposing rectangles within one area. Therefore, no area difference occurs due to the position change of the pen touch, making it impossible to detect the position change caused by the pen touch.

As a result, the touch area change due to the movement of the pen does not occur linearly but occurs block by block corresponding to the size change of the rectangle. This reduces linearity, leading to problems such as poorly formed writing or illegible characters when writing with a pen.

SUMMARY

Technical Problem

The present invention has been proposed to address the aforementioned problems of the prior art Its primary objective is to provide an object location detection device where the change in the touch-effective area corresponding to the pen's position change occurs linearly. Additionally, it aims to offer a touch sensor structure associated with the diameter of the pen tip to prevent touch detection errors. Furthermore, the invention seeks to provide an enhanced object detection device that avoids the moiré phenomenon caused by the optical coupling between the display device and the ODA, ensuring improved visual perception.

Technical Solution

To achieve the aforementioned objectives, a first configuration Object Detection Area (ODA) installed on one side of a display device, composed of a transparent conductive material, connected on one side to an ODA signal line and not connected to another signal; An ODA column consisting of multiple said first configuration ODAs stacked together; ODA signal lines, each connected to the first configuration ODAs included in the ODA column; The multiple ODA signal lines, not connected to other signal lines, arranged in the same direction on one side of the ODA column, forming a Signal Line Harness (SLH); A Touch IC that determines the presence of touch based on the voltage magnitude detected from the ODA signal line; The said ODA column where the number of said first configuration ODAs increases from a far distance to a near distance based on the Touch IC, the quantity of the ODA signal lines also increases, and the area of the first configuration ODA gradually decreases due to the increasing number of said first configuration ODAs; A second configuration ODA link area located in the center of the said first configuration ODA, composed of a transparent conductive material, and forming part of the said first configuration ODA; Multiple second configuration ODAs, composed of a transparent conductive material with a predetermined area, are connected to the said second configuration ODA link area. These second configuration ODAs are arranged in both the first and second directions based on the second configuration ODA link area and constitute the said first configuration ODA; The overlapping area is formed between the first centerline of the first configuration ODA and the first centerline of a neighboring first configuration ODA. Multiple second configuration ODAs, originating from the second configuration ODA link area that constitutes the first configuration ODA, are arranged in the first direction. Additionally, multiple second configuration ODAs, originating from the second configuration ODA link area that constitutes the neighboring first configuration ODA, are arranged in the second direction. These said second configuration ODAs are cross-arranged to form the overlapping area; and, Centered around the second configuration ODA link area, three of the first configuration ODAs are spaced apart by a specific distance to form inter-line capacitance. When the nth signal line in the ODA column is selected as the sensing signal line, either the (n−1) or (n+1), or both (n−1) and (n+1) ODA signal lines in the same ODA column are selected as driving signal lines. A driving voltage is then applied to the selected driving signal line to detect the object capacitance added to the sensing ODA connected to the sensing signal line.

Moreover, The voltage detected from the nth sensing signal line when no object capacitance is added to the sensing ODA connected to the nth sensing signal line is determined by [Equation 1], and the voltage detected from the nth sensing signal line due to the object capacitance Cobj added to the sensing ODA is determined by [Equation 2], wherein the presence of touch and touch coordinates are extracted based on the result of [Equation 1]-[Equation 2].

$$Vp2 - Vp1 = \frac{(Vd2 - Vd1) * Cd}{Cd + Cprs + Ccm} \quad \text{[Equation 1]}$$

$$Vp2 - Vp1 = \frac{(Vd2 - Vd1) * Cd}{Cd + Cprs + Ccm + Cobj} \quad \text{[Equation 2]}$$

Wherein,
a) Cd is the inter-line capacitance formed between the sensing ODA and the driving ODA.
b) Ccm is the common electrode capacitance formed by the sensing ODA facing the common electrode of the display device.
c) Cprs is the parasitic capacitance formed on the sensing ODA signal line.
d) Vp1 is the voltage detected from the sensing ODA when a driving voltage Vd1 is applied to the driving ODA.
e) Vp2 is the voltage detected from the sensing ODA when a driving voltage Vd2 is applied to the driving ODA.

Furthermore, the said second configuration ODA is characterized by being an isosceles rectangle or an isosceles triangle.

Furthermore, the third configuration ODA, which has a smaller area than the said second configuration ODA and the conductive material is removed, is characterized by being arranged either inside or outline of the second configuration ODA in an up, down, left, or right direction.

Furthermore, the center points of the vertically arranged third configuration ODAs pass through a virtual first longitudinal centerline, and the center points of the horizontally arranged third configuration ODAs pass through a virtual first transverse centerline, where the intervals between multiple neighboring longitudinal centerlines are same, and the intervals between neighboring transverse centerlines are also same.

Furthermore, for the first direction second configuration ODA and the second direction second configuration ODA that face each other in the overlapping area from different first configuration ODAs, the average area of the effective region composed of a conductive material of the third configuration ODA row that constitutes the first direction second configuration ODA and the third configuration ODA row of the same row that constitutes the second direction second configuration ODA is the same regardless of the position of the third configuration ODA row.

Furthermore, the multiple second configuration ODAs constituting the said first configuration ODA are arranged with a certain interval facing the second configuration ODA link area of the neighboring first configuration ODA, and this certain interval is applied identically to all the second configuration ODAs.

Furthermore, the multiple third configuration ODAs arranged left and right constitute a third configuration ODA row, and when the second configuration ODA is composed of multiple such third configuration ODA rows arranged vertically, the areas of the multiple third configuration ODAs that constitute a certain third configuration ODA row are of the same size.

Furthermore, the multiple third configuration ODAs arranged left and right constitute a third configuration ODA row, and when the second configuration ODA is composed of multiple such third configuration ODA rows arranged vertically, the area of the third configuration ODA varies between different third configuration ODA rows. Furthermore, when the vertical position of the third configuration ODA row changes, the area of the third configuration ODA increases or decreases at a certain consistent ratio.

Furthermore, the increase or decrease in the area of the third configuration ODA is characterized by symmetrically changing at the same ratio to the left and right of a virtual longitudinal centerline passing through the center point of the third configuration ODA.

Furthermore, the long side and/or short side forming the outline of the third configuration ODA is configured to have a certain angle with the source signal line and/or gate signal line of the display device.

Furthermore, the said third configuration ODA is one or a combination of a rectangle, diamond, leftward chevron, rightward chevron, a line with a certain angle, or shapes like X, Z, or V.

Furthermore, when one of the leftward or rightward chevrons forms a longitudinal column of the third configuration ODA by stacking vertically, and the other also forms a longitudinal column of the third configuration ODA by stacking vertically, the two different longitudinal columns of the third configuration ODA are placed adjacent to each other with a phase difference of 180 degrees.

Furthermore, the leftward and rightward chevrons alternate and stack vertically to form a longitudinal column of the third configuration ODA, and multiple such longitudinal columns are successively arranged adjacent to each other.

Furthermore, the short side of the rectangle, leftward chevron, rightward chevron, or the line with a certain angle, or shapes like X, Z, or V that constitute the third configuration ODA is configured to have a certain angle with respect to the transverse direction.

Furthermore, the outline of the third configuration ODA, which constitutes one ODA column, is of the same shape.

Furthermore, the leftward or rightward chevron is composed of two diagonal lines that are symmetrical vertically. A virtual horizontal line passes through the junction where the two diagonal lines meet. Based on this horizontal line, the angles of the diagonal lines above and below the junction are identical.

Furthermore, different second configuration ODAs that constitute different first configuration ODAs and face each other in the overlapping area have a facing interval. This interval is an integer multiple, starting from 1, of the pitch of the short side of the neighboring third configuration ODA or the pitch between the longitudinal centerlines of the neighboring third configuration ODAs.

Furthermore, the third configuration ODA constituting the second configuration ODA is used for the ODA signal line connected to one side of the said second configuration ODA, and the pitch of the virtual longitudinal centerline and transverse centerline of the third configuration ODA used for the ODA signal line is the same as the pitch of the longitudinal centerline and transverse centerline of the third configuration ODA belonging to the neighboring second configuration ODA.

Furthermore, the third configuration ODA connected continuously is used for the electrical insulation of the ODA signal lines constituting the SLH, and between the continuously connected third configuration ODAs, a Dummy third configuration ODA is arranged. The Dummy third configuration ODA is constructed with the same outline as the third configuration ODA and is stacked separately.

Furthermore, one or multiple of the third configuration ODA rows are installed at the Second configuration ODA Link Area, and the area of the third configuration ODA included in the third configuration ODA row has linearity that continues concerning the increase or decrease of the neighboring third configuration ODA.

Furthermore, the number of third configuration ODA rows included in the second configuration ODA arranged in the said first direction or the said second direction is identical to the number of third configuration ODA rows included in the second configuration ODA arranged in the said first direction or the said second direction, which constitutes the neighboring first configuration ODA in the ODA column.

Furthermore, the different second configuration ODAs cross-arranged in the overlapping area have the same area when calculated based on their outline.

BRIEF DESCRIPTION OF THE FIGURES

FIG. 4 is an embodiment of the present invention regarding the area change based on the position of the Third Configuration ODA constituting the half-wing of Row4 ODA and its vertically adjacent Row3 and Row5 ODA.

DETAILED DESCRIPTION

Figure 1:
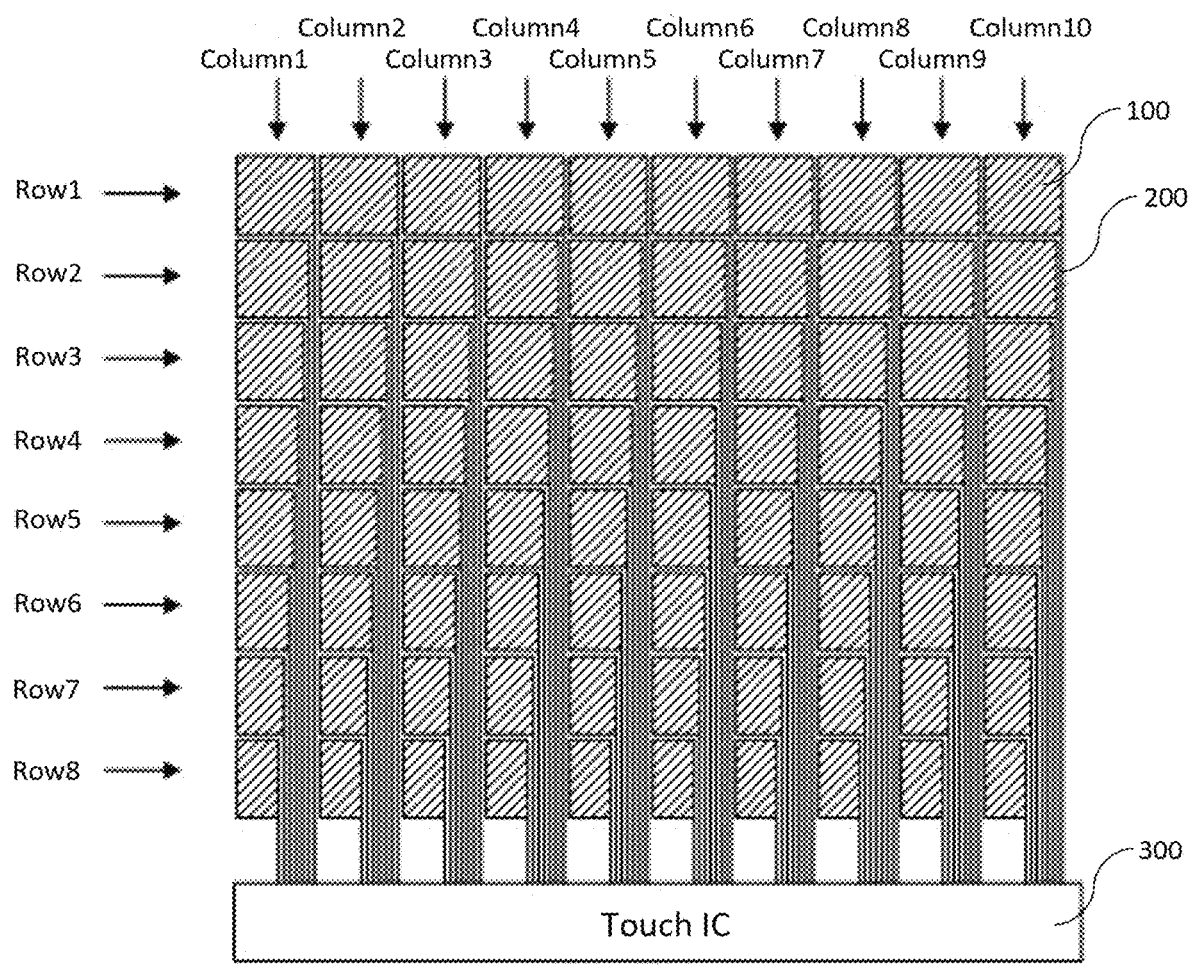
FIG. 1 is an object detection device according to one embodiment of the present invention.

Terms used in this invention were chosen based on their general usage in the current context, considering their function in this invention. However, these terms can change depending on the intentions of technicians in the field, legal precedents, or the emergence of new technologies. In specific cases, terms arbitrarily chosen by the applicant are used. In such cases, their meanings will be detailed in the relevant sections of the description of the invention. Therefore, terms used in this invention should be defined based on their meanings and the overall content of the invention.

Furthermore, the size and thickness of each component shown in the drawings are arbitrarily depicted for the sake of explanation, and the invention is not necessarily limited to what is shown. To clearly represent various layers and areas in the drawings, thicknesses and widths have been exaggerated. When one part of a layer or area is said to be "above" or "on top" of another, it includes cases where there are other parts in between.

Distances and directions, such as "far" and "near", are based on the Touch IC 300. "Far" means distant from the Touch IC 300, while "near" means close to the Touch IC 300. The longitudinal and lateral directions of the object detection device of this invention are also based on the Touch IC 300. The ODA column of this invention is understood to be installed longitudinally, as it is positioned vertically relative to the Touch IC.

The Source Drive IC of the display device 10 is assumed to be located at the bottom, and the Gate Drive IC is assumed to be on the right. The Gate Drive IC can be a separate semiconductor IC or can be integrated into the display device using the TFF.

Throughout the specification, when a part "includes" a component, it means that, unless specifically stated otherwise, it can also include other components. Terms like "part" and "module" in the specification refer to units that handle at least one function or operation. These can be implemented in hardware, software, or a combination of both.

The ODA 100 and its connected ODA signal line 200 are distinct geometrically but have the same electrical meaning. Thus, "detecting voltage from the sensing ODA" means the same as "detecting voltage from the signal line connected to that sensing ODA". In this specification, sensing ODA signal lines and driving ODA signal lines are collectively referred to as ODA signal lines. They are differentiated as either sensing ODA signal lines or driving ODA signal lines when a clear distinction is needed.

Under the control of the Touch IC, the ODA operates sequentially as a sensing ODA, a driving ODA, or an ODA that doesn't perform any function. In this specification, "voltage detected from the ODA" has the same meaning as "voltage detected when the ODA operates as a sensing ODA".

This invention's capacitive detection device is a "system" that applies driving voltage to the driving signal line neighboring the sensing signal line and detects voltage from the sensing signal line after its voltage potential stabilizes. The mathematical expression representing the voltage detected from the sensing signal line after applying driving voltage to the driving signal line is expressed as the system's "transfer function".

When the object detection device of this invention is installed on the surface of the display device, the surface of the object detection device is covered with protective materials like glass or plastic. Therefore, when writing with a pen on the object detection device or performing touch gestures, it should be considered that the touch occurs on the surface of the protective material.

The Object Detection Area (ODA) is used with the same meaning as the touch sensor. The long side of the third configuration ODA is the vertical outline, and the short side is the horizontal outline.

In the following, the attached drawings are referred to provide a detailed explanation, enabling those with ordinary skill in the technical field to easily implement the embodiments of the invention. However, the invention can be implemented in various forms and is not limited to the embodiments described herein. In the drawings, parts unrelated to the explanation have been omitted, and similar parts throughout the specification have been labeled with similar drawing symbols.

Figure 2:
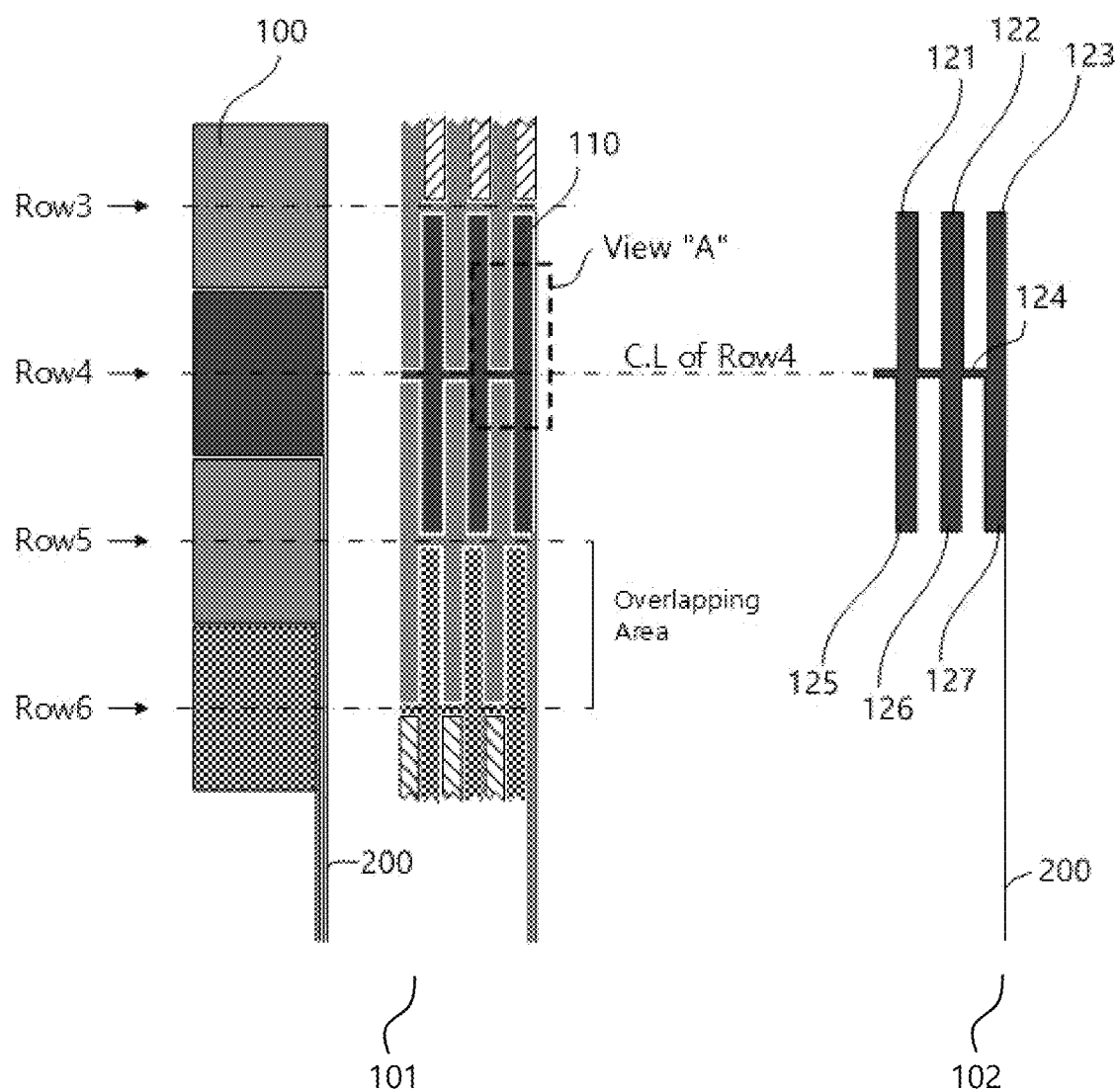
FIG. 2 is an embodiment of the present invention regarding the cross-arrangement of ODA

FIG. 2 is an embodiment of the invention related to the cross-arrangement of the ODA. The Row3 ODA to Row6 ODA 101 are from an arbitrary ODA column in FIG. 1. The Row4 ODA 102 consists of six rectangles 121,122,123,125, 126,127 and a link area 124. Each rectangle is arranged vertically opposing each other based on the second configuration ODA link area 124. Among the six isosceles rectangles, one is referred to as the second configuration ODA, which can be composed of transparent conductive materials like ITO, IZO, or Metal Mesh. The second configuration ODAs are electrically interconnected by the second configuration ODA link area 124. Multiple second configuration ODAs and the second configuration ODA link area 124 in FIG. 2 are connected to a single ODA signal line 200, referred to as the first configuration ODA. Thus, the first configuration ODA consists of one ODA signal line 200, multiple second configuration ODAs 121,122,123,125,126, 127, and the second configuration ODA link area 124. While the Row3 ODA to Row6 ODA 101 represent the conceptual configuration of the first configuration ODA, the Row4 ODA 102 represents its actual appearance. In the Row4 ODA 102, it's possible to predict the size of the inter-line capacitance formed between two facing ODAs or the touch area with the pen.

The Row4 ODA 102 represents the first configuration ODA belonging to Row4 among the four ODAs in the Row3 ODA to Row6 ODA 101. Based on the center line (C.L), it consists of the second configuration ODA facing the far direction (above the center line) and the second configuration ODA facing the near direction (below the center line), and the second configuration link area 124 between the far and near direction second configuration ODAs. For convenience in this specification, the second configuration ODA in the far direction is referred to as the first half-wing, and the second configuration ODA in the near direction is referred to as the second half-wing.

The first and second half-wings extend near the center line of the neighboring ODA but are placed at a certain distance from the second configuration link area 124 of the neighboring ODA. Therefore, at the second configuration link area 124, its half-wings expand vertically, and the edges of the two half-wings expanded from two vertically neighboring ODAs are placed with a certain space in between, so three first configuration ODAs are located (only two first configuration ODAs are located at the topmost and bottommost ODAs).

If the edge of the half-wing, placed vertically adjacent to the second configuration link area 124 of the neighboring ODA, exceeds the center line of the ODA of the second configuration connection part, the exceeded area will lose the second configuration link area 124, breaking the electrical connection between the second configuration ODAs that make up the first configuration ODA 110. This results in a problem where stable touch detection becomes impossible. Therefore, the edge of the half-wing should be placed at a certain distance from the second configuration link area 124 of the neighboring ODA.

Also, the first and second half-wings originating from any ODA share an overlapping area with neighboring ODAs. For instance, the first half-wing of the Row4 ODA intersects and faces the second half-wing of the Row3 ODA in the overlapping area, and the second half-wing of the Row4 ODA intersects and faces the first half-wing of the Row5 ODA in the overlapping area. The overlapping area is the area between the center lines of two neighboring ODAs.

The overlapping area, in the conceptual ODA layout of FIG. 2a, is formed by two neighboring ODAs contributing an equal area between their centerlines (C.L). If the contribution ratio between the two ODAs is different, a detection error occurs where the detected coordinates are not consistent with the touch area ratio. Therefore, the contribution ratio should be the same for each ODA. The two opposing half-wings in the overlapping area are spaced apart by a certain distance to avoid electrical shorting.

In the overlapping area, the total length of the facing distance, which is the sum of all the lengths where they face each other, becomes longer as the number of second configuration ODAs increases. The size of the inter-line capacitance formed between the two facing ODAs is proportional to the total length of the facing distance. Compared to the later-described FIG. 10A, the facing distance total length of FIG. 10C is longer, so FIG. 10C has a larger inter-line capacitance than FIG. 10A.

In the overlapping area, the size of the inter-line capacitance formed between the two facing ODAs is located in the denominator of the transfer function, as exemplified in the later-described Equations 2 to 3. Referring to Equations 2 to 3, as the size of the inter-line capacitance increases, the denominator of the transfer function becomes larger, resulting in a decrease in detection voltage, i.e., a decrease in touch sensitivity. Therefore, to improve touch sensitivity, it is desirable to reduce the size of the inter-line capacitance. To reduce the size of the inter-line capacitance, the number of second configuration ODAs should be reduced, and the facing width should be increased.

On the other hand, based on the later-described FIGS. 10A to 10E, the number of second configuration ODAs should be increased to improve the resolution of pen coordinate detection. The performance of pen coordinate detection and pen touch sensitivity are inversely proportional. To improve pen touch sensitivity, another means such as enhancing the precision of the ADC or increasing the size of the driving voltage can be provided. Therefore, prioritizing the improvement of coordinate detection functions, it's better to have as many second configuration ODAs as possible. However, as the number of second configuration ODAs increases, the size of the inter-line capacitance formed in the overlapping area between the two facing ODAs increases. Therefore, another way to reduce the size of the inter-line capacitance is to increase the facing width between the two facing ODAs.

Referring to FIG. 12 of the cited invention 1, it can be seen that the pink second pattern and the yellow second pattern are separated by a white chevron. As described later, the size of one chevron is determined in conjunction with the size of the sub-pixel of the display device and is similar to the size of the sub-pixel. According to recent display device manufacturing capabilities, the size of a pixel of the display device does not exceed 300 um (H)×300 um (V), so the size of the sub-pixel constituting the pixel is smaller than 100 um (H)×300 um (V). Since the size of the chevron constituting the pink second pattern and the yellow second pattern in FIG. 12 of the cited invention 1 is similar to the size of the sub-pixel, it can be inferred that the pink second pattern and the yellow second pattern are separated by about 100 um.

The two second patterns of Cited Invention 1, which face each other at a width of one chevron, have a high possibility of short-circuiting due to process defects such as foreign substances or exposure defects during the manufacturing process. The size of the inter-line capacitance increases by about 30% or 60% when the facing width is two or three chevrons. Therefore, it is desirable for the two ODAs facing each other in the overlapping area of the present invention FIG. 2 to have a multiple distance, such as double or triple, based on the pitch (or longitudinal centerline pitch) of the short side of the third configuration ODA described later.

Referring to the Row3 ODA to Row6 ODA 101, for the first and second half-wings originating from one ODA, there are ODAs with areas that are the same and not the same due to the influence of the ODA signal line 200. In the case of Row4 ODA, it is only affected by the signal line of the upper Row3 ODA, so the area ratio of the first and second half-wings of Row4 ODA is the same. On the other hand, Row5 ODA is affected by two ODA signal lines, the Row4 ODA signal line and the ODA signal line originating from its second configuration ODA link area 124, so the area of the second half-wing decreases compared to the first half-wing.

Thus, for ODAs where the ODA signal line 200 originates from their second configuration ODA link area 124, the area of the lower second half-wing decreases compared to the upper first half-wing. In cases where the touch area, like a pen, is significantly smaller than the area of the half-wing, touch coordinate detection errors due to the area difference between the first and second half-wings that make up a first configuration ODA do not occur. However, touches by a wide area, like a finger, can be located simultaneously on the first and second half-wings that make up one first configuration ODA, so touch coordinate detection errors can occur due to the area difference between the first and second half-wings.

Therefore, when the areas of the first and second half-wings that make up one first configuration ODA are different, it is desirable to compensate for the area difference of the second half-wing, which has a smaller area than the first half-wing. The compensation method involves calculating the area of the second half-wing to be proportionally larger by the area reduced by the ODA signal line 200, and this operation can be performed using software built into the Touch IC 300. At this time, the compensation area size is determined by an equation that takes into account the position of the ODA in the ODA column, the touch area, and the area reduction amount due to the ODA signal line.

Figure 3:
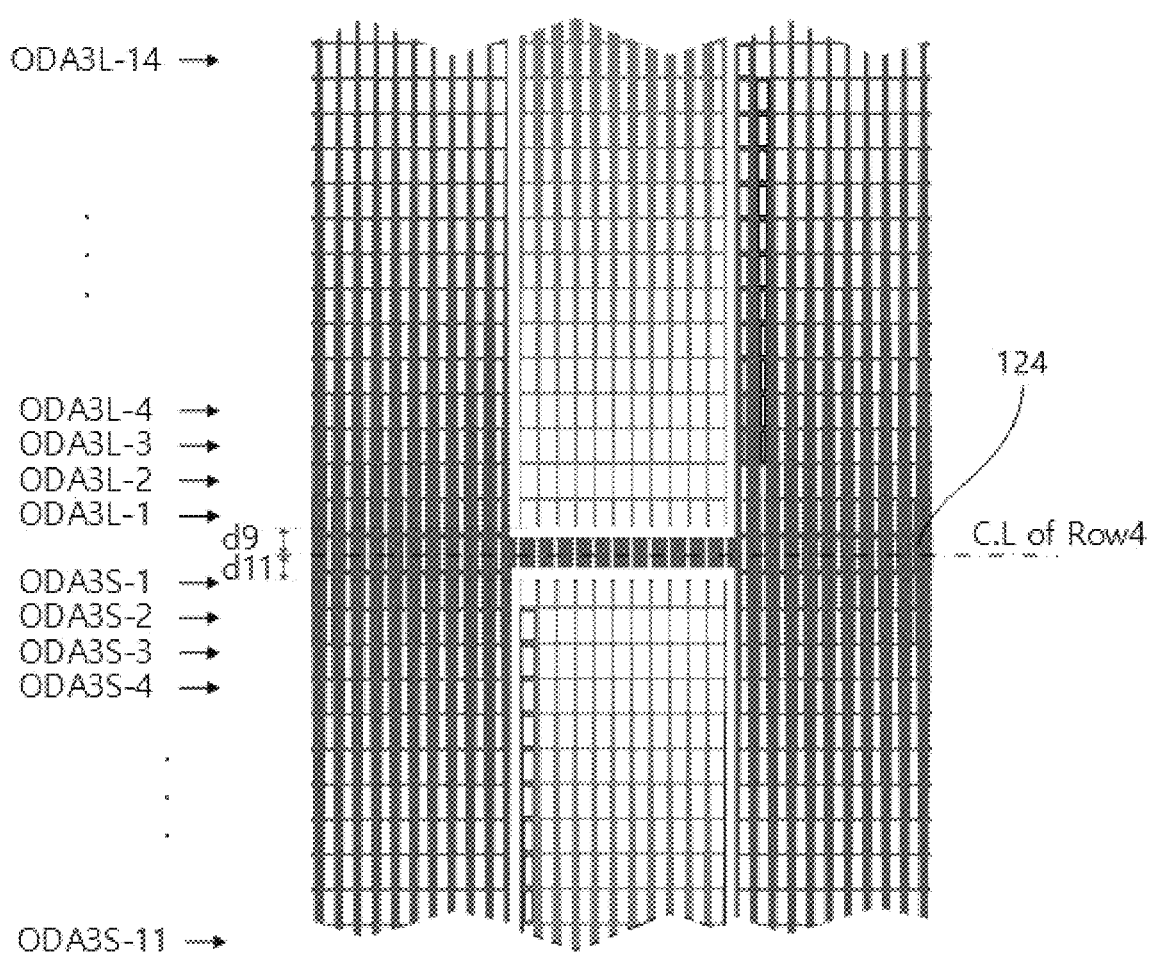
FIG. 3 is a detailed view of View "A" in FIG. 2.

FIG. 3 is a detailed view of View "A" in FIG. 2. Referring to FIG. 3, based on the centerline (C.L of Row4) of Row4 ODA, the first and second half-wings of Row4 ODA unfold, with the second half-wing of Row3 positioned between the first half-wings of Row4 ODA, and the first half-wing of Row5 ODA positioned between the second half-wings of Row4 ODA.

Each half-wing has multiple rectangles arranged regularly in all directions, with the area gradually increasing or decreasing depending on the vertical installation position. Shapes with the same geometric shape placed inside the second configuration ODA are referred to as third configuration ODAs. The third configuration ODA in the example of FIG. 3 is an isosceles rectangle, but all geometric shapes of diagonal shapes with certain angles with vertical and horizontal lines, such as chevrons, rhombuses, diamond-shaped rectangles, or V-shaped X shapes, can be used as third configuration ODAs.

The third configuration ODA is not only placed in the second configuration ODA but is also placed in the SLH, and all geometric shapes of the object position detection device of the present invention are formed based on the third configuration ODA.

Referring to FIG. 3, the third configuration ODA, which is located at the second configuration ODA link area 124 where the (virtual) centerline (C.L of Row4) of Row4 is located and is indicated in white, has the smallest area, and as object move towards the edge of the half-wing, the area of the third configuration ODA gradually increases. The third configuration ODA is an area where the conductor has been removed and is indicated as a white rectangle in FIG. 3. For reference, Row4 ODA is indicated in dark gray, as in the example of FIG. 2, and Row3 ODA and Row5 ODA are indicated in light gray.

When a touch occurs due to an object, the object capacitance (Cobj) formed between the sensing ODA and the object is determined as follows in [Equation 1].

$$Cobj=eS/d \qquad \text{[Equation 1]}$$

Wherein, e is the dielectric constant, S is the area where the sensing ODA and the object face each other, and d is the separation distance between the sensing ODA and the object.

Since the third configuration ODA is in a state where the conductor has been removed, the larger the area of the third configuration ODA, the size of the area "S" representing the "effective area for touch detection" decreases in Equation 1, reducing the size of the object capacitance. In the example of FIG. 3, where the third configuration ODA area is smallest at the centerline of the ODA and gradually increases towards the edge of the half-wing, the size of the object capacitance (Cobj) due to the same touch area decreases as object move towards the edge of the half-wing.

When there is no touch, the voltage detected in the sensing ODA when a drive voltage is applied to the drive ODA is determined as follows in Equation 2.

$$Vp2 - Vp1 = \frac{(Vd2 - Vd1) * Cd}{Cd + Cprs + Ccm} \quad \text{[Equation 2]}$$

Wherein, Cd is the inter-line capacitance formed between the sensing ODA and the drive ODA facing each other, Ccm is the common electrode capacitance formed by the sensing ODA and the common electrode of the display device facing each other, Cprs is the parasitic capacitance formed on the sensing ODA signal line, Vp1 is the voltage value detected in the sensing ODA when the drive voltage Vd1 is applied to the drive ODA, and Vp2 is the voltage value detected in the sensing ODA when the drive voltage Vd2 is applied to the drive ODA.

Additionally, when a touch by an object occurs, and an object capacitance Cobj is formed between the object and the sensing ODA, the voltage detected in the sensing ODA when a drive voltage is applied to the drive ODA is determined as follows in Equation 3.

$$Vp2 - Vp1 = \frac{(Vd2 - Vd1) * Cd}{Cd + Cpsr + Ccm + Cobj} \quad \text{[Equation 3]}$$

Comparing Equation 2 and Equation 3, Equation 3 adds the object capacitance Cobj to the denominator of the transfer function expressed in Equation 2. Therefore, when a touch occurs, the result of [Equation 2]-[Equation 3] becomes greater than zero, making it possible to extract the presence of a touch and its coordinates based on the result.

In the example of FIG. 3, the area of the third configuration ODA is smallest at the centerline of the ODA (i.e., the ODA effective area is the largest), and as object move towards the edge of the half-wing, it gradually increases. However, it's also possible to arrange the third configuration ODA so that its area is largest at the centerline of the ODA and gradually decreases as object move towards the edge of the half-wing. The length of the short side of the third configuration ODA changes depending on the row position (e.g., ODA3L-1 or ODA3L-2) it belongs to, but the length of the long side remains unchanged. Since the vertical width of all ODA's second configuration link area 124 and the length of the half-wing are the same in this invention, the number of rows of the third configuration ODA included in the half-wing is the same.

In FIG. 3, the row of the third configuration ODA included in the first half-wing of Row4 ODA is denoted as ODA3L, and the row of the third configuration ODA included in the second half-wing is denoted as ODA3S. Here, "3" represents the third configuration ODA, "L" represents the long direction, and "S" represents the short direction.

Referring back to FIG. 3, the row area of the third configuration ODA pointed to by ODA3L-1 is where the first half-wing of Row4 ODA starts and the second half-wing of Row3 ODA ends. Also, the row area of the third configuration ODA pointed to by ODA3S-1 is where the second half-wing of Row4 ODA starts and the first half-wing of Row5 ODA ends. The half-wings of Row3 ODA and Row5 ODA do not infringe on the (virtual) centerline of Row4 ODA. Also, the distance d9 from the endpoint of the second half-wing of Row3 ODA to the centerline of Row4 ODA and the distance d11 from the endpoint of the first half-wing of Row5 ODA to the centerline of Row4 ODA are the same, and this rule applies to all ODAs in this invention.

Meanwhile, it is desirable for the row of the third configuration ODA where the half-wing starts (for example, ODA3L-1 in FIG. 3) to be the point where the half-wing of the neighboring ODA facing each other in the overlapping area ends.

The third configuration ODA is sized to correspond to the pixels of the display device to avoid moiré patterns. In more detail, a pixel consists of sub-pixels representing Red/Green/Blue, and the size of the third configuration ODA is determined in relation to the size of the sub-pixel. For example, if the size of the third configuration ODA is related to the size of the sub-pixel, and the size of the sub-pixel is 70 um (H)×210 um (V), the maximum possible area of the third configuration ODA is determined to be 70 um (H)×210 um (V). When the area of the third configuration ODA is 10%, it means that 10% of the maximum possible area of the third configuration ODA, 7 um (H)×210 um (V), has the conductor removed, and the 90% area where the conductor is not removed is the effective area for touch detection.

In this invention, from the start to the end of the half-wing, the area of the third configuration ODA increases or decreases at a certain constant rate (in this specification, it is assumed that the area of the third configuration ODA gradually increases from the start to the end of the half-wing).

FIG. 4 is an example of the present invention regarding the area change of the third configuration ODA constituting the half-wings of Row4 ODA and the neighboring Row3 ODA and Row5 ODA depending on the position of the third configuration ODA.

Referring to FIGS. 3 and 4, the area of the third configuration ODA in ODA3L-1 of FIG. 3, where the first half-wing of Row4 ODA starts, is assumed to be 10%, so the effective area is 90%. Also, since ODA3L-1 is also the endpoint of the second half-wing of Row3 ODA, if the area of the third configuration ODA is assumed to be 80%, the effective area is 20%. The effective area ratio of Row4 ODA at ODA3L-1 is 90%, and the effective area ratio of Row3 ODA is 20%, so the average effective area of the entire ODA3L-1 row is 55%.

In the example of FIG. 4, if the area of the third configuration ODA constituting the first half-wing of Row4 ODA and the second half-wing of Row3 ODA is increased or decreased by 1% each time the row where the third configuration ODA is located changes, the average effective area of all rows of the third configuration ODA is 55%.

Also, by the same rule, in the ODA3S area, which is the overlapping area of the second half-wing of Row4 ODA and the first half-wing of Row5 ODA, the average effective area of all rows of the third configuration ODA is 55%.

Using the third configuration ODA design technique described above, when the touch area by a pen occupies the same proportion of the area of the two half-wings placed in the overlapping area, the sum of the object capacitances detected from the two half-wings by the pen moving up and down is always the same regardless of the pen's position. However, the individual object capacitance sizes detected from the first and second half-wings due to the pen's vertical movement change frequently depending on the pen's position.

For instance, for two ODAs located in the overlapping area, when the "touch area" by the pen occupies the same proportion of the area of the two half-wings placed in the overlapping area, let's assume the "effective area" of the pen touch in the first half-wing is "s1" and in the second half-wing is "s2". The sum of s1+s2 remains the same regardless of the pen's position in the overlapping area, and the sizes of s1 and s2 change in relation to the vertical position of the pen. The pen's position can be determined by a simple equation like s1/(s1+s2) or s2/(s1+s2). (Both s1 and s2 need to be converted to object capacitance based on Equations 1 to 3, and this process is performed by the Touch IC.)

What's crucial in the embodiment based on FIGS. 3 and 4 is that the area of the third configuration ODA applied at the endpoints and starting points of the ODA row is consistently applied to all ODAs. Also, every time the row of the third configuration ODA changes, the rate of area change of the third configuration ODA remains the same. Moreover, in the overlapping area, the starting point of one ODA's half-wing and the endpoint of another ODA's half-wing are located on the same row.

When the pen is positioned in the center of the first configuration ODA, specifically the second configuration ODA link area 124, the pen touch occurs in three ODAs: the second configuration ODA link area 124 and the two neighboring ODAs. Assuming the pen Tip's diameter is 2 mm and the vertical width of the second configuration ODA link area 124 is 2.5 mm, when the pen moves vertically within the 2.5 mm vertical width of the second configuration ODA link area 124, the area changes in the neighboring ODA's first and second half-wings in contact with the second configuration ODA link area 124 are not detected. Thus, the pen's vertical movement is measured as non-existent. This can result in writing that is not linear and is illegible.

Additionally, if the vertical width of the second configuration ODA connection part 124 is extremely narrow (for example, 0.2 mm), rapid changes in the area caused by the first and second half-wings of the neighboring ODA in contact with the second configuration ODA connection part 124 will be observed when the pen moves vertically centered on the second configuration ODA connection part 124. As a result, the second configuration ODA connection part 124 may not properly serve its threshold function, causing minor tremors of the pen in the vertical direction to be reflected in the writing. This can lead to unnatural handwriting or a significant breakdown in linearity, preventing the formation of smooth and natural writing.

To address these issues, the lower limit of the vertical width of the second configuration ODA link area 124 is one-third of the pen Tip's diameter, and the upper limit is the diameter of the pen Tip. If the width of the short side of the link area 124 is one-third of the pen Tip, the pen Tip shares ⅓ of the width equally with the link area 124 and the two adjacent half-wings. This ensures linear area changes for vertical pen movement near the link area 124, resulting in linear writing.

If the short side of the link area 124 has the same diameter as the pen tip, even though excellent linearity is not guaranteed, the area changes detected for the pen's vertical movement will include the areas of the link area 124 and the adjacent half-wings, ensuring at least a writing environment.

It's desirable that the area of the third configuration ODA included in the link area 124 is determined so that the linearity of the increase and decrease of the third configuration ODA in the first and second half-wings continues at the endpoints and starting points. For instance, in the examples of FIGS. 3 and 4, if the area of the third configuration ODA in ODA3L-1 and ODA3S-1 is 10% and the rate of change is 1%, it's preferable for the area of the third configuration ODA placed alone in the link area 124 to be determined as 9%. If three third configuration ODAs are arranged in different rows in the link area 124, the area of the third configuration ODA located near the centerline should be 8%, and the remaining two should be 9%. If four third configuration ODAs are arranged in different rows, the areas of the two closest to the centerline should be 8%, and the remaining two should be 9%.

The above description, based on FIGS. 3 and 4, was explained with reference to Row4 ODA to Row5 ODA as an example, but it is not limited to specific ODAs and applies to all ODAs.

Figure 5:
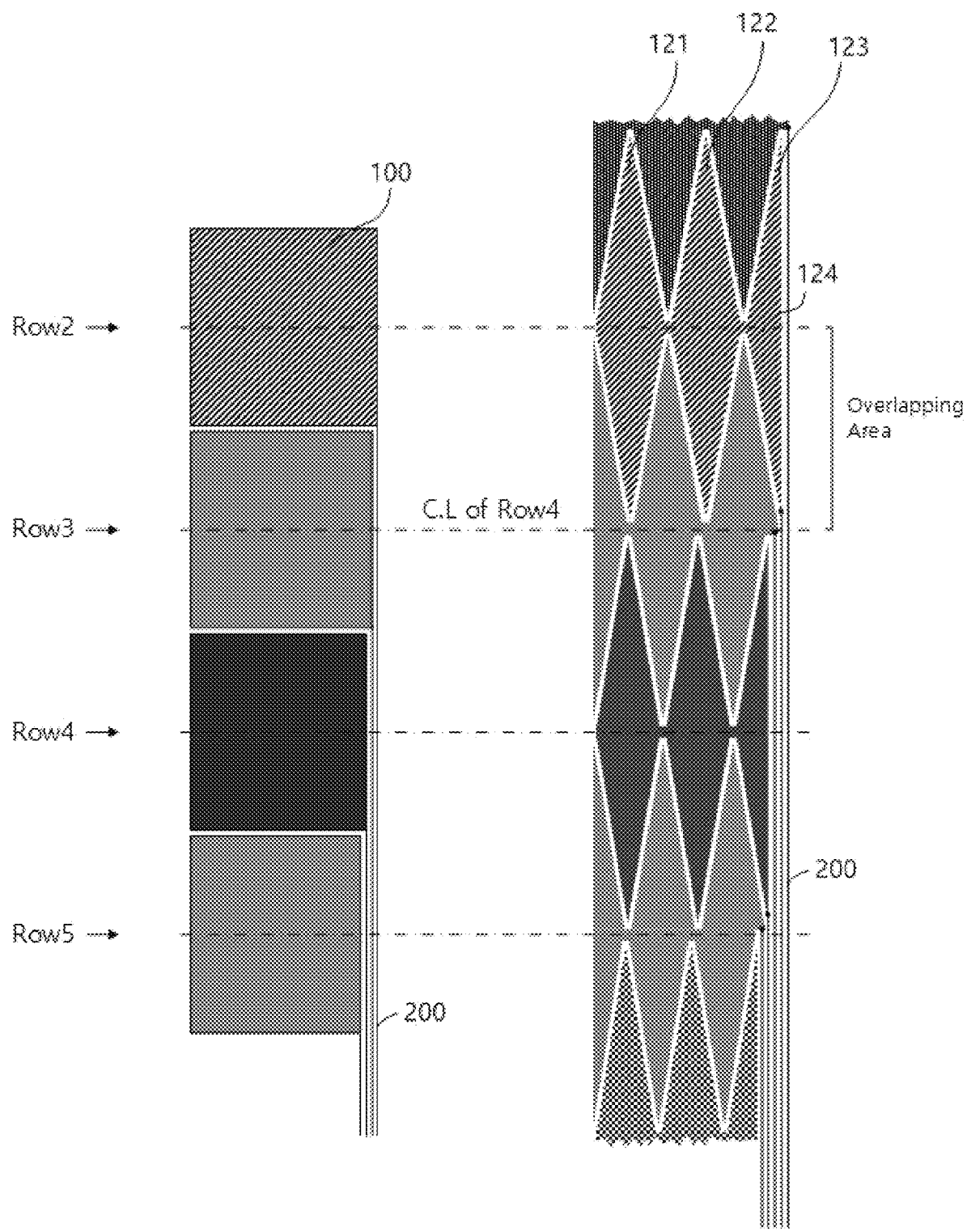
FIG. 5 is an embodiment of the present invention where the Second Configuration ODA is composed of an isosceles triangle.

FIG. 5 is an embodiment of the present invention where the second configuration ODA is composed of an isosceles triangle. In the case where the first configuration ODA is composed of a triangular-shaped second configuration ODA facing each other vertically based on the second configuration ODA link area 124, as in the example of FIG. 5, all the technical concepts introduced in FIGS. 2 to 4 are applied identically. As mentioned earlier, these technical concepts include 1) the configuration of the overlapping area, 2) the increase and decrease of the third configuration ODA in the overlapping area, 3) the sum of the effective areas of the first and second half-wings in the overlapping area being the same, 4) the starting and ending points of the third configuration ODA row being located on the same row, and 5) area compensation.

As mentioned later, the problems cited in the embodiment of Drawing 12 of Cited Invention 1 can be resolved by the linear area change of the third configuration ODA that constitutes the second configuration ODA of this invention. Also, since the linear area change of the third configuration ODA and the area change of the second configuration ODA, which is triangular, occur simultaneously, it is possible to detect touch signals with superior characteristics.

Figure 6A:
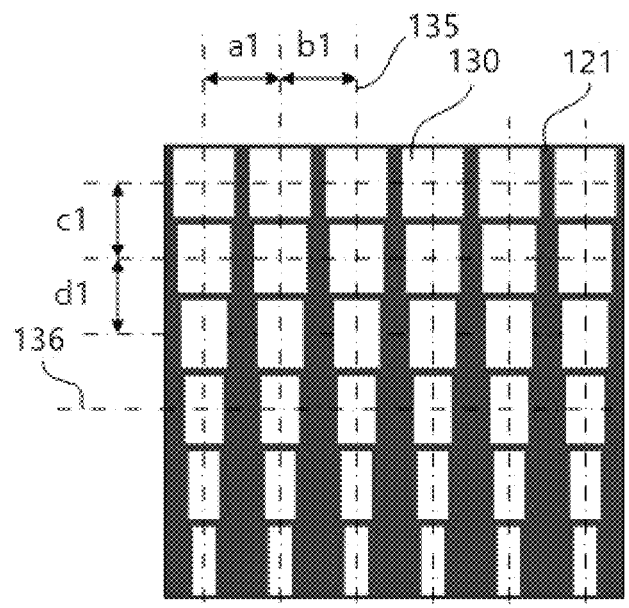
FIGS. 6A and 6B are embodiments of the present invention regarding the method of reducing and expanding the area of the Third Configuration ODA.
Figure 6B:
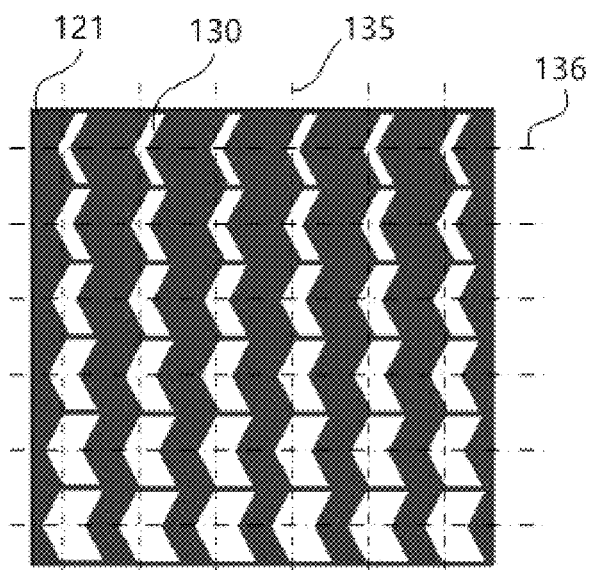

FIGS. 6A and 6B are embodiments of the present invention concerning the method of reducing and expanding the area of the third configuration ODA. In this embodiment, the second configuration ODA 121, represented in dark gray as a conductor, has the third configuration ODA 130, which is white due to the removal of the conductor, placed on it. The third configuration ODA 130 increases or decreases in area at a constant rate from top to bottom, and it expands symmetrically left and right based on the imaginary longitudinal centerline 135. For instance, when the area change rate of the third configuration ODA due to vertical arrangement is 1%, it changes by 0.5% to the left and 0.5% to the right based on the longitudinal centerline 135. In the embodiment of FIG. 6A, as object moves from top to bottom, the area of the third configuration ODA decreases at a certain constant rate. In contrast, in the embodiment of FIG. 6B, as object moves from top to bottom, the area of the third configuration ODA increases at a certain constant rate. The direction of increase or decrease is determined by compatibility with pixels, so it's preferable to determine this through simulation or actual placement during the design phase.

Regarding the placement of the third configuration ODA based on the longitudinal centerline 135, the pitch, i.e., the distance between neighboring longitudinal centerlines 135, is consistent. For example, "a1" or "b1" in FIG. 6A represents the pitch between neighboring longitudinal centerlines 135, and both a1 and b1 have the same value. Also, the pitch "c1" and "d1" of the horizontal centerline 136 connecting the horizontal centers of the third configuration ODA should be of the same value, and the pitch between neighboring horizontal centerlines 136 should also be consistent. This is because the size of the third configuration ODA is determined corresponding to the pixels or sub-pixels of the display device, and since the size of the pixels in the display device is consistent, the arrangement of the third configuration ODA should also be uniform. Therefore, the pitch of the neighboring third configuration ODA's longitudinal centerline 135 should be the same, and the pitch of the neighboring horizontal centerline 136 should also be the same. In FIG. 3, all the pitches of the horizontal centerlines within one half-wing, such as in ODA3S-1 to ODA3S-11, are the same. However, the pitch size between the horizontal centerline 136 of ODA3S-1 and the centerline (C.L of Row4) can be different from the pitch of the horizontal centerlines 136 included in the half-wing. This is used as an offset to place the starting and ending points of the third configuration ODA in the second configuration ODA at the same position in all ODAs. Thus, in this invention, the pitch of the horizontal centerline 136 of the third configuration ODA placed in the half-wing of the second configuration ODA is consistent, but the pitch between the horizontal centerline 136 where the third configuration ODA starts and the centerline (C.L) of the ODA can be different.

FIG. 6B shows a case where the leftward chevron is used as the third configuration ODA. As mentioned earlier, the pitch between the longitudinal centerlines 135 included in the half-wing is consistent, and the pitch between the horizontal centerlines is also the same.

Figure 7:
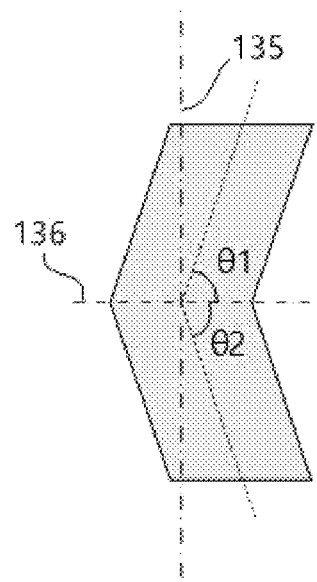
FIG. 7 is an embodiment of the present invention concerning the position of the centerline and the determination of the diagonal angle when the leftward chevron or rightward chevron is used as the Third Configuration ODA.

FIG. 7 is an embodiment of the present invention concerning the position and angle determination of the imaginary longitudinal centerline 135 and horizontal centerline 136 when the leftward or rightward chevron is used as the third configuration ODA. In the embodiment of FIG. 6B, where the leftward chevron is used as the third configuration ODA, the third configuration ODA's longitudinal centerline 135 and horizontal centerline 136 pass through the center point of the two diagonally symmetrical junctions, as shown in the embodiment of FIG. 7. The leftward chevron expands or contracts symmetrically in the left and right directions based on the imaginary longitudinal centerline 135. For example, if the center point increases by 0.1 mm to the left, it also increases by 0.1 mm to the right from the center point, determining the diagonal width.

Also, when the leftward chevron or rightward chevron is used in this invention and its area is reduced or expanded, the angles ($\theta 1$ and $\theta 2$ in FIG. 7) of the two diagonals before and after the area change based on the longitudinal centerline 135 should remain the same. It's also preferable for $\theta 1$ to equal $\theta 2$. The angle of the diagonal is an essential variable determining the degree of moiré when it faces the pixels or sub-pixels of the display device. Therefore, it's preferable to maintain the same angle for the diagonals of all chevrons to minimize moiré. This technical concept is also applied identically to the Z-shaped and X-shaped third configuration ODAs mentioned later and is applied to all third configuration ODAs that have an embodiment suitable for the technology of this invention.

Figure 8:
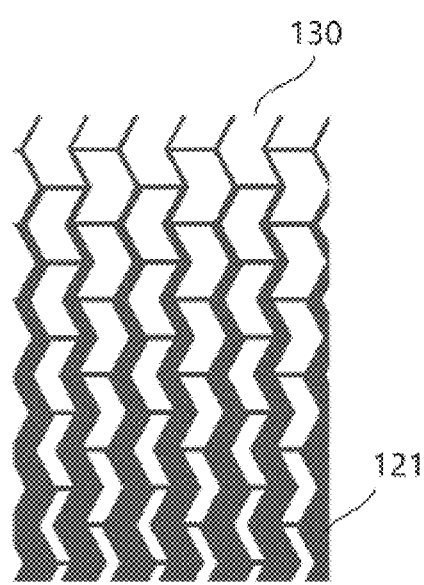
FIG. 8 is an embodiment of the present invention in which the Third Configuration ODA is formed by a combination of the leftward chevron and the rightward chevron.

FIG. 8 is an embodiment of the present invention where the third configuration ODA is formed by a combination of leftward and rightward chevrons. In FIG. 8, the second configuration ODA 121, represented in dark gray as a conductor, has the third configuration ODA 130 placed on it, with the conductor of the third configuration ODA being removed. Columns of ODAs composed of leftward chevrons and rightward chevrons are used alternately in the longitudinal direction, maintaining a 180-degree phase difference. One advantage of using two identical third configuration ODAs with a 180-degree phase difference, as in FIG. 8, compared to the embodiment in FIG. 6B without such a phase difference, is that the horizontal straight-line shape between the third configuration ODAs is not placed on a single horizontal line but is separated into two horizontals. This reduces the probability of being parallel to the Gate signal line 12 of the display device, resulting in better moiré avoidance. In cases like FIG. 8 or the later-mentioned FIG. 14, the third configuration ODA of this invention can be used alternately in the longitudinal direction, maintaining a 180-degree phase difference.

Figure 9:
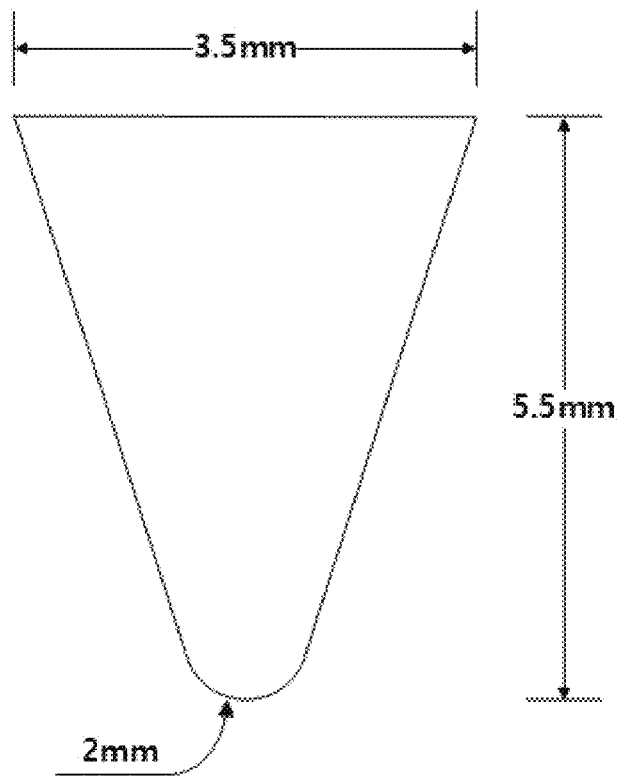
FIG. 9 is an embodiment of the present invention regarding the shape of the pen tip used in the object detection device of the invention.

FIG. 9 is an embodiment of the present invention concerning the shape of the pen tip used in the object detection device of this invention. Referring to FIG. 9, the length (Height) of the pen tip is 5.5 mm, and the diameter of the pen that contacts the object detection device is defined as 2 mm. Although not shown in the drawing of FIG. 9, when the pen contacts the object detection device and a certain force is applied, the "contact switch" of the pen turns on, notifying the system that the pen is in contact with the object detection device. The host CPU of the system processes signals by distinguishing between a mode that accepts pen touch information when the contact switch is turned on and a mode that accepts pen touch input when the pen's contact switch is turned off in a hovering state over the object detection device. The hovering state refers to the pen floating above the protective glass surface of the object detection device, so the touch area of the pen tip cannot be predicted. On the other hand, when the pen's contact switch is turned on, it indicates that the ODA covered with protective glass and the hard material-made pen tip are in contact with the protective glass. Therefore, regardless of the touch location of the pen, the touch area of the pen tip is the same as the area shown in the drawing.

To design and manufacture the object detection device of this invention, all information about the provided pen must be considered. For example, the USI (The Universal Stylus Initiative) specification defines all specifications for the Stylus Pen. To create an object detection device compliant with the USI standard, one must follow the pen specifications set by USI. Also, the MPP (Microsoft Pen Protocol) has all specifications for the pen defined. To use pen touch in the Windows environment provided by Microsoft, one must follow all the pen specifications set by MPP.

The pen specifications include the geometric shape related to the pen, such as the diameter of the pen tip, as well as information (Tx) based on the voltage radiated from the pen, its magnitude, frequency, or frequency modulation, and the frequency and sequence for information input (Rx). Based on the pen information provided in advance, the number of the second configuration ODAs or the long and short side widths of the second configuration ODA are reflected in the design, and matters related to the protocol are also input into the Touch IC (300) using firmware.

Figure 10A:
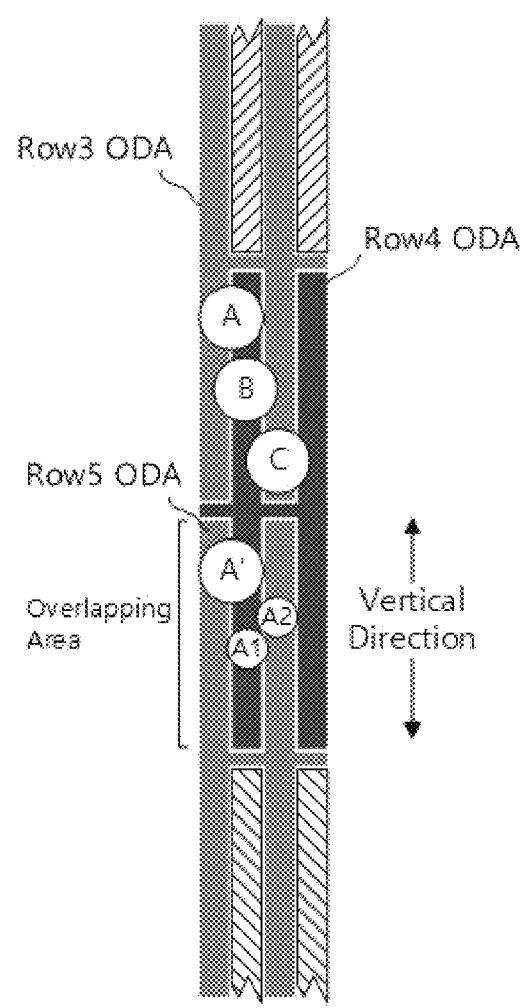
FIGS. 10A to 10E are embodiments of the present invention illustrating the configuration of the Second Configuration ODA and its correlation with the touch area of the pen tip.
Figure 10B:
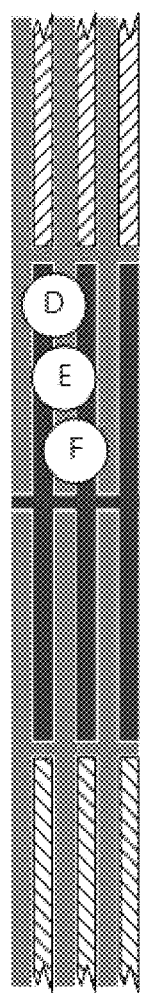
Figure 10C:
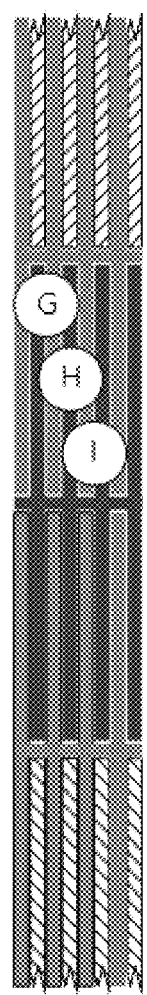
Figure 10D:
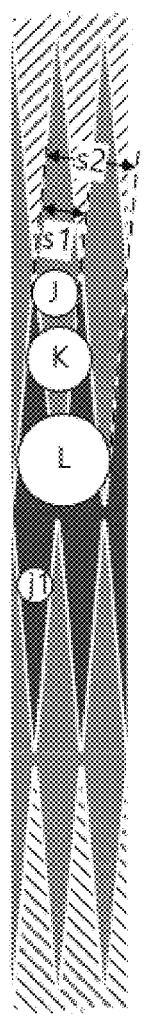
Figure 10E:
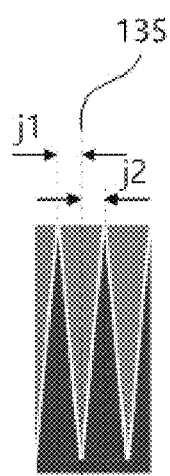

FIGS. 10A to 10E are embodiments of the present invention showing the relationship between the configuration of the second configuration ODA and the touch area of the pen tip. FIGS. 10A to 10C show cases where the second configuration ODA is an isosceles rectangle, and FIGS. 10D and 10E show cases where the second configuration ODA is an isosceles triangle.

Referring to FIGS. 10A to 10E, similar to FIG. 2, the ODA filled in dark gray is the Row4 ODA. Above and below the Row4 ODA are the Row3 ODA and Row5 ODA, respectively, filled in light gray. A to L represent the touch area and location of the pen tip.

In actual use cases, the short side length of the ODA column is typically 4-5 mm, and the long side length is about 10-20 mm. In one embodiment of this invention, assuming the short width of the ODA column is 4 mm, as in the case of FIG. 10A, when there are four second configuration ODAs in the overlapping area, the short side pitch width of a single second configuration ODA is 1 mm. In FIG. 10B, where there are six second configuration ODAs in the overlapping area, the short side pitch width of a single second configuration ODA is about 0.67 mm. In FIG. 10C, where there are eight second configuration ODAs, the short side pitch width of a single second configuration ODA is 0.5 mm.

Also, as in FIGS. 10D and 10e, when two neighboring first configuration ODAs in the overlapping area form five triangles with 2.5 triangles each, j1 or j2, which are between the imaginary vertical lines passing through the center points of each triangle, are defined as the short side pitch width of the second configuration ODA. In the case of FIG. 10D, the short side pitch width for the five triangles is 0.8 mm.

When writing or freely moving the pen on the object detection device, the movement of the pen is detected in the ODA as vector quantities in the vertical and horizontal directions. The Touch IC 300 extracts the vertical and horizontal touch coordinates and notifies the system's host CPU. The vertical touch coordinates of the pen are detected based on the capacitive difference detected from multiple ODAs located above and below one or multiple ODA columns, and the horizontal touch coordinates of the pen are determined based on the capacitive ratio detected from multiple ODA columns. Therefore, the data referred to extract the vertical touch coordinates will be data such as y1, y2, y3 extracted from the vertical axis, and the data referred to extract the horizontal touch coordinates will be data such as x1, x2, x3 extracted from the horizontal axis (where y1 or x1, etc., are voltages extracted based on the touch area from Equations 2 or 3).

If the pen is located near ODA column 3, even if the width of the pen tip is only 2 mm (since the height of the pen tip in the embodiment of FIG. 9 is 5.5 mm), capacitive formation with the pen tip occurs through the spatial electromagnetic field in ODA columns 2 and 4. Using x2 extracted from ODA column 2, x3 extracted from ODA column 3, and x4 extracted from ODA column 4, it is possible to detect the horizontal touch coordinates.

The present invention detects the vertical touch coordinates of the pen based on the difference in the touch-effective area ratio of the pen touching the first and second half-wings of the two ODAs facing each other in the overlapping area. Although the object is limited to a pen, in the case of a finger, which has a wider area than the pen tip, it is even easier to extract touch coordinates. Therefore, even if a pen is used as an example of an object in this specification, the same touch detection method applies to finger touch.

In the embodiment of FIGS. 10A to 10E, it is assumed, as in the embodiment of FIG. 3, that the area of the third configuration ODA increases linearly as it moves from the centerline of the ODA to the edge of the ODA wing.

In "overlapping area 1" of FIG. 10A, as pen "A'" moves downward while maintaining the same touch area on the second configuration ODA of Row4 ODA and the first configuration ODA of Row5 ODA, the effective area of Row4 ODA decreases linearly, and the effective area of Row5 ODA increases linearly. Also, assuming that the areas of the pen touching Row4 ODA and Row5 ODA are the same, regardless of the pen's position, the average effective area of Row4 ODA and Row5 ODA is always constant, and only the sizes of individual effective areas change linearly with each other.

The linear change in touch area due to pen touch in this invention is an improvement over the non-linear change in the cited invention 1, where the touch area of the pen changes only at inflection points where the size of the rectangle, such as rectangle 1230 or 1240 in drawing 12, changes. This shows that the present invention is more advanced than the cited invention 1.

Referring to rectangles 1230 or 1240 in FIG. 12 of the cited invention 1, there are inflection points where the area of the rectangle changes every 8 or 9 chevron-shaped figure, which can be considered as the third configuration ODA of this invention. Only when the pen passes the inflection point does the touch area change. Unlike the present invention, where the touch area changes every time the pen moves through a single chevron in the vertical direction, in the cited invention 1, the touch area changes every time the pen passes through 8 or 9 chevrons in the same rectangle.

The cited invention 1 may have readability issues because the pen writing is not linear, making character recognition impossible. However, in the present invention, the touch area changes every time the position of the third configuration ODA changes due to the movement of the pen, indicating improved linearity compared to the cited invention 1. As a result, characters formed by pen touch in the present invention appear more natural.

According to a quantitative analysis method, since the touch area changes every 8 or 9 chevrons in the cited invention 1, and the touch area changes every single chevron in the present invention, the linearity of the pen in the present invention is improved by about 8 to 9 times compared to the cited invention 1.

Meanwhile, when pen A' located in overlapping area 1 of FIG. 10A touches Row4 ODA and Row5 ODA with the same area, if the area of the effective area touched by the pen in Row4 ODA is called s1 and the area of the effective area touched by the pen in Row5 ODA is called s2, the size of s1+s2 remains constant for the vertical movement of the pen, as examined in the embodiment of FIG. 4.

When the pen is at the upper side of overlapping area 1, the size of s1 is larger than s2, and when the pen is at the lower side of overlapping area 1, the size of s2 is larger than s1. At this time, the position of the pen is determined by a simple calculation of s1/(s1+s2) or s2/(s1+s2).

If the pen is located at the link area 124 of the second configuration ODA of Row4 ODA, since it shares an area with the second half-wing of Row3 ODA and the first half-wing of Row5 ODA, the vertical coordinates of the pen are determined by calculating the center of gravity based on the area of the three shared ODAs.

FIG. 10A is an embodiment where the short side pitch of the second configuration ODA is half of the pen tip. In the case where a pen with a diameter of 2 mm touches the second half-wing of Row3 ODA and the first half-wing of Row4 ODA at position A with the same ratio, the touch area ratio of Row3 ODA and Row4 ODA is 50:50. However, at position B, since the touch area ratio of Row4 ODA is larger, a detection error occurs, measuring the pen to be lower than its actual position. Also, at position C, since the touch area of Row3 ODA is larger, a detection error occurs, measuring the pen to be higher than its actual position.

FIG. 10B is an embodiment where the short side pitch of the second configuration ODA is one-third of the pen tip. In areas D and F of FIG. 10B, since the touch areas of Row3 ODA and Row4 ODA are the same, no detection error occurs. However, in area E, since the touch area of Row4 ODA is larger, a touch coordinate detection error occurs. The area occupancy difference in area E is more improved than in areas B or C.

FIG. 10C is an embodiment where the short side pitch of the second configuration ODA is one-fourth of the diameter of the pen tip. In areas G and I, since the touch areas of Row4 ODA and Row5 ODA are the same, no detection error occurs. Also, although a coordinate detection error occurs in area H, it can be seen that the detection error is improved compared to areas B and E.

FIG. 10D is an embodiment where the second configuration ODA is composed of triangles. Unlike the embodiments of FIGS. 10A to 10C, in addition to the change in the effective area due to pen touch, the area of the second configuration ODA, which is composed of conductive material, also changes. That is, depending on the position of the pen, both the effective area difference due to the area difference of the third configuration ODA and the area of the conductive material constituting the second configuration ODA change together.

In FIG. 10D, J represents a case where the short side pitch of the second configuration ODA is half the diameter of the pen tip. Since it has the same length as s1, which is the inside of the rectangle made up of two second configuration ODAs, the actual touch position of the pen based on the touch area of the two second configuration ODAs is normal. If the short side pitch of the second configuration ODA exceeds half the diameter of the pen tip, as in j1, a touch will not occur on the light gray triangle part of Row5 ODA, resulting in a touch coordinate detection error.

In FIG. 10D, K represents a case where the short side pitch of the second configuration ODA is one-third the diameter of the pen tip. Only three second configuration ODAs were touched in the center of the overlapping area. As a result, since the area occupancy rate of the dark gray Row4 ODA is larger, a detection error will occur, detecting the pen touch coordinate lower than its actual position.

Meanwhile, the position L in FIG. 10D represents a case where the short side pitch of the second configuration ODA is one-fourth the diameter of the pen tip. Since it has the same length as s2, which is the inside of the rectangle made up of two second configuration ODAs, the actual touch position of the pen based on the touch area of the four second configuration ODAs is normal.

In the case where the second configuration ODA is an isosceles triangle, the maximum pitch of the second configuration ODA's short side is half the diameter of the pen tip. Also, the width of the short side pitch of the second shape should be determined by a denominator, such as ½, ¼, or ⅙ of the pen tip diameter. As a result, touch coordinate detection errors do not occur because the pen touches occur in even numbers of second configuration ODAs, not odd numbers.

As examined above, it can be seen that the narrower the short side pitch width of the second configuration ODA compared to the diameter of the pen tip, the more the position detection error of the pen is improved. However, as more second configuration ODAs are installed on the first configuration ODA, the length facing the two second configuration ODAs facing each other in the overlapping area increases. This increases the size of the inter-line capacitance (Cd) in equations 2 or 3, weakening touch sensitivity. Therefore, there is a limit to the increase in the number of second configuration ODAs. It is desirable for the short side pitch of the second configuration ODA to be about one-fourth the diameter of the pen tip.

On the other hand, the maximum length of the short side pitch width of the second configuration ODA should be equal to or less than half the diameter of the pen tip. In the embodiment of FIG. 10A, in the case of A1 where the short side pitch of the second configuration ODA exceeds half the diameter of the pen tip, since mostly only the area of Row4 is detected by the pen touch, the pen A1 will be detected as being located at the upper part of overlapping area 1. In the case of A2, where the short side pitch of the second configuration ODA exceeds half the diameter of the pen tip, a detection error will occur, measuring the pen A2 as being located at the lower part of overlapping area 1. To prevent such significant detection errors, it is desirable that the short side pitch of the second configuration ODA does not exceed half the diameter of the pen tip.

If the outer edges of the second configuration ODA (121,122,123,125,126,127) of the object detection device of the present invention and the third configuration ODA 130 and ODA signal line 200 are installed on the surface of the display device in a vertical or horizontal straight line, interference with the display device's components, such as the Source signal line and Gate signal line, may cause moiré phenomena, leading to a decrease in display quality. Therefore, measures should be introduced to avoid this.

Figure 11:
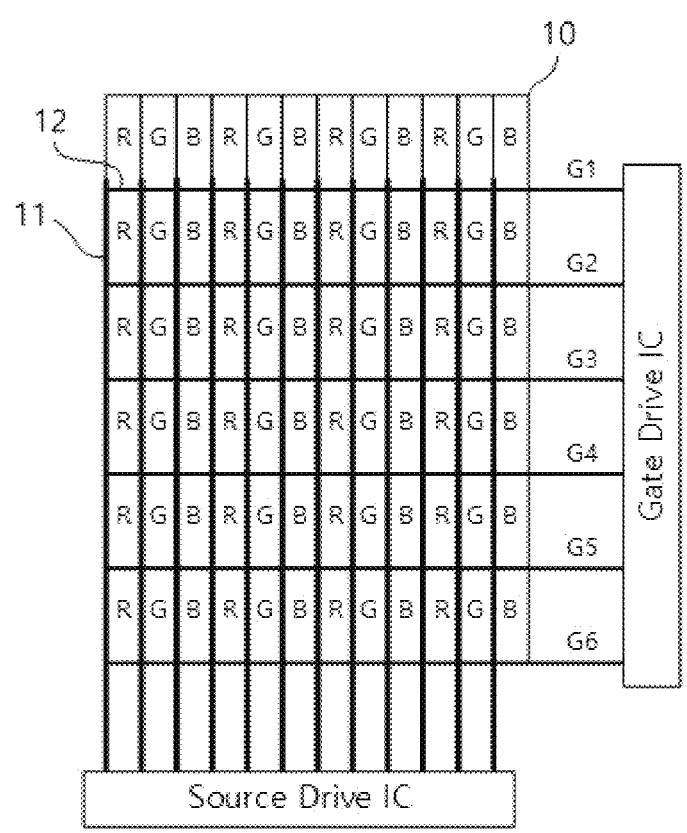
FIG. 11 is a display device with a resolution of 4×6.

FIG. 11 is a display device 10 with a resolution of 4×6. In reality, display devices 10 would use very high resolutions like FHD (1920×1080) or UHD (3840×2160), but a low resolution of 4×6 is assumed in the depicted embodiment to aid understanding of the present invention.

The display device is composed of a collection of unit pixels, each consisting of three sub-pixels: Red, Green, and Blue. FIG. 11 shows a layout with four unit pixels arranged horizontally and six rows of pixels arranged vertically, resulting in a resolution of 4×6. The pixel voltage provided by the Source Drive IC is supplied to each sub-pixel through the thick vertical signal line labeled as Source signal line 11. The Gate Signal Line 12 is installed horizontally, separate from the physical layer of the Source signal line 11. It supplies the turn-on or turn-off voltage from the Gate Drive IC to the switching device, TFT (Thin Film Transistor), installed in each sub-pixel.

The turn-on voltage from the Gate is sequentially supplied in the order of Gate Line 1 (G1)→G2→G3→G4→G5→G6→G1. . . using a time-sharing method, sequentially activating the pixels in the horizontal direction. Turn-off voltage is applied to the remaining Gate signal lines, excluding the Gate signal line to which the turn-on voltage is applied.

Light emitted from the BLU (Back Light Unit) of a display device 10 like an LCD is partially blocked by vertically arranged Source signal lines 11 or horizontally arranged Gate signal lines 12, causing a contrast difference with surrounding pixels. Similarly, self-lighting displays like OLEDs also have contrast differences with pixels around the signal lines since vertically arranged Source signal lines 11 or horizontally arranged Gate signal lines 12 do not emit light.

If an object detection device with second configuration ODAs and ODA signal lines arranged horizontally or vertically, as in FIG. 2, is installed on the surface of an LCD or OLED, or if an object detection device with third configuration ODAs arranged vertically and horizontally, as in FIG. 6A, is installed, the light is partially blocked vertically and horizontally by the conductive material constituting the ODA, causing a difference in transmittance.

At this time, in some areas, only one or both of the display device's Source signal line 11 or Gate signal line 12 are recognized. In other areas, the Source signal line 11 or Gate signal line 12 overlaps with the second configuration ODA or third configuration ODA or ODA signal line of the object detection device, resulting in a moiré pattern due to the repetition of light and dark patterns.

Moiré interference is an interference that occurs when spatial patterns with periodicity overlap. The pattern perceived by the observer due to moiré interference is commonly referred to as a moiré pattern or moiré phenomenon. Moiré patterns act as a factor that degrades display quality. The size and shape of such moiré patterns vary depending on the pixel size, the position of the observer, and the distance between the object detection device and the display device when they face each other.

One way to avoid such moiré patterns is to ensure that the second configuration ODA or third configuration ODA or ODA signal line of the object detection device does not lie on the same horizontal or vertical line as the display device's Source signal line 11 and Gate signal line 12.

FIGS. 12A to 12F are embodiments of the present invention concerning the shape of the third configuration ODA to avoid moiré. Since the Source signal line 11 of the display device 10 in FIG. 11 is arranged vertically, to avoid having the vertical outline of the third configuration ODA on the same vertical line as the Source signal line 11, the long side outline of the third configuration ODA is diagonally constructed to form a certain angle with the vertical line (the gray-shaded third configuration ODA in FIGS. 12A to 12F indicates that the conductor has been removed).

Figure 13:
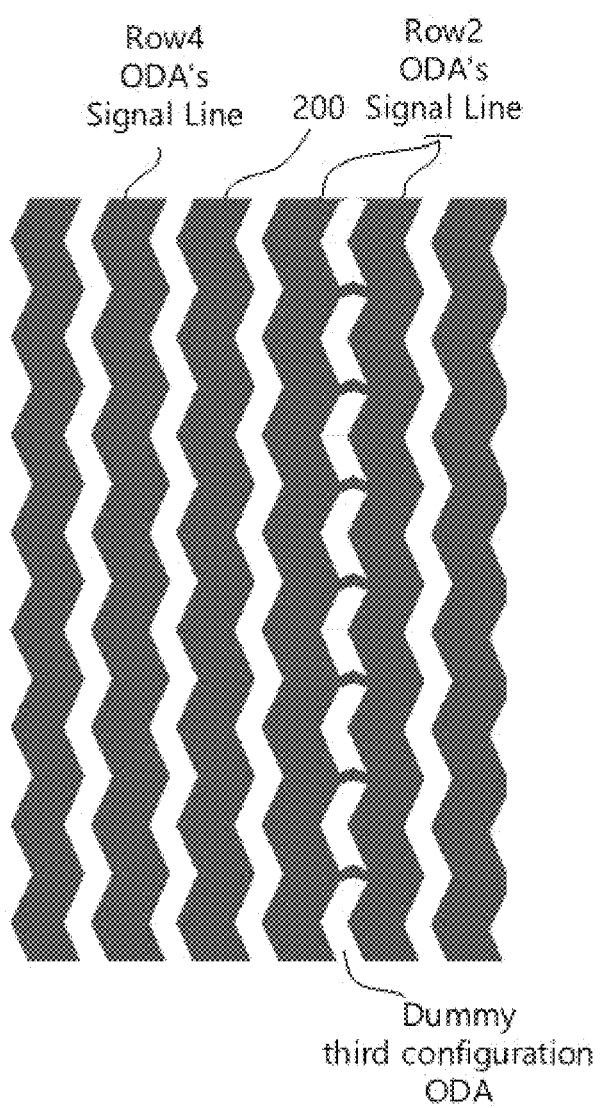
FIG. 13 is an embodiment of the present invention regarding the Third Configuration ODA used in the SLH (Signal Line Harness), which represents a bundle of ODA signal lines.

The third configuration ODA determines the shape of the second configuration ODA, and as in the embodiment of FIG. 13, the shape of the ODA signal line is also determined by the third configuration ODA. Therefore, the second configuration ODA and ODA signal line 200 are also formed diagonally by the diagonally constructed third configuration ODA. Accordingly, all geometric shapes that make up the object detection device of the present invention are formed diagonally based on the shape of the third configuration ODA.

In FIGS. 12A to 12F, the long sides of the leftward chevron or rightward chevron are composed of two diagonals with different angles, and they have a single inflection point at the center of their overlapping area.

Since the Gate signal line 12 of the display device 10 is installed horizontally, the short side of the third configuration ODA should be formed as a diagonal with a certain angle to the horizontal line. At this time, the diagonal can be composed of a single diagonal, two compound diagonals with a single inflection point, or compound diagonals with two or more inflection points.

Figure 12A:
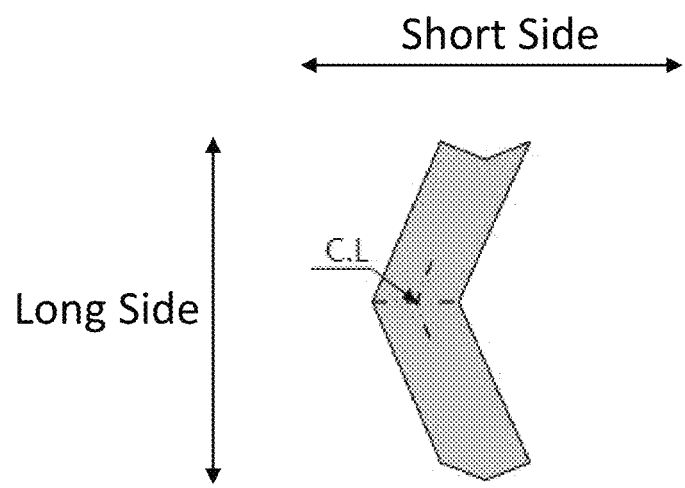
FIGS. 12A to 12F are embodiment of the present invention regarding the appearance of the Third Configuration ODA to avoid the Moiré effect.
Figure 12B:
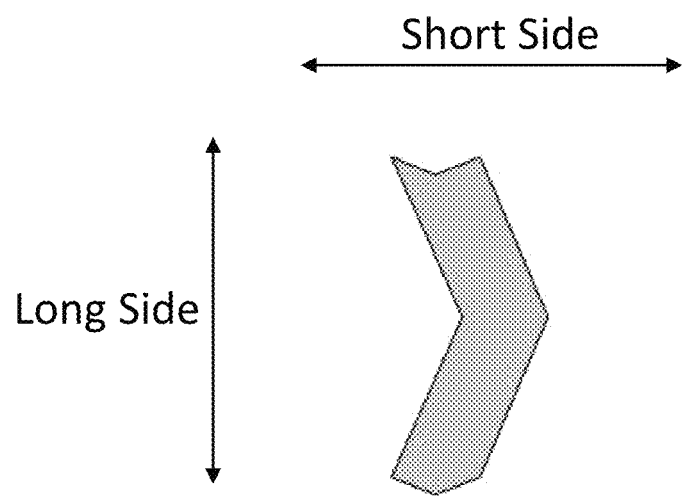
Figure 12C:
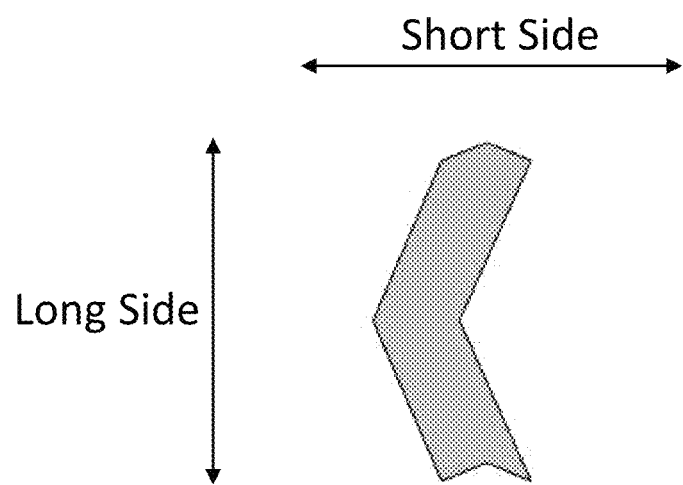
Figure 12D:
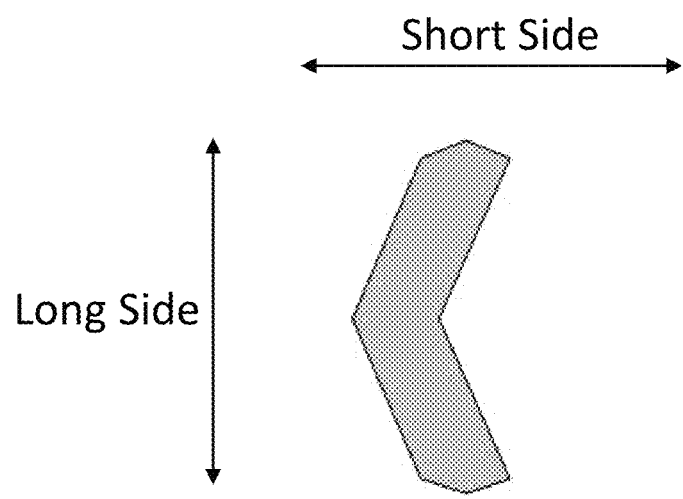
Figure 12E:
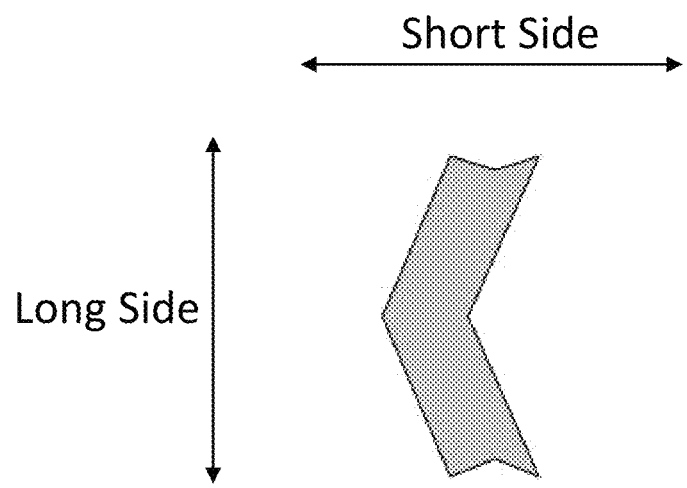
Figure 12F:
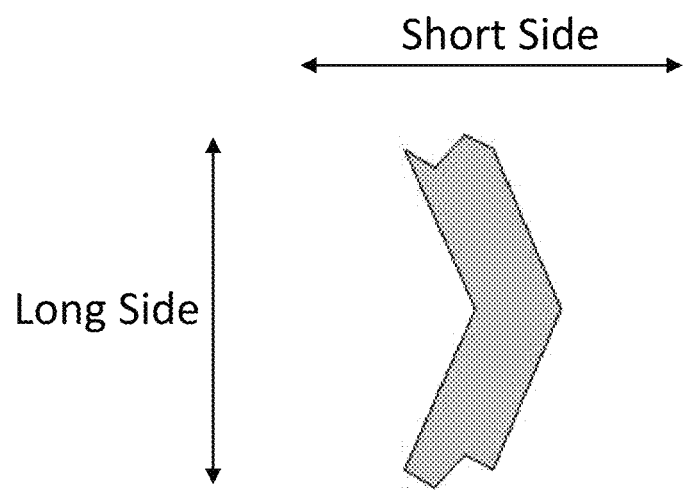

In FIGS. 12A to 12E, except for FIG. 12F, all short sides of the third configuration ODA are composed of compound diagonals with two diagonals and one inflection point to avoid being located in the same horizontal direction as the Gate signal line 12. Also, FIG. 12F is composed of a compound diagonal with three diagonals and two inflection points.

The area of the third configuration ODA in the shape of a chevron, depending on the location of the half-wing of the second configuration ODA, as in the embodiment of FIG. 12A, is reduced or expanded symmetrically to the left and right based on the C.L (Center Line) at the center of the overlapping area.

FIG. 12A has a short side protruding downward, while FIG. 12B is the opposite phase of FIG. 12A. FIGS. 12A and 12B can be used simultaneously side by side with a 180-degree phase difference, as in the embodiment of FIG. 8.

Also, the short side of FIG. 12C protrudes upward, the short side of FIG. 12D protrudes both upward and downward, and the short side of FIG. 12E protrudes downward and upward. FIGS. 12D and 12E can be continuously stacked vertically.

As in the embodiment of FIGS. 12A to 12F, the short side of the third configuration ODA can protrude in a single direction, either upward or downward, by a double diagonal, and it can also protrude in both upward and downward directions. Also, the third configuration ODA with short sides protruding both upward and downward can be continuously stacked vertically.

In FIGS. 12A to 12F, embodiments based on the short side of the chevron shape aim to prevent the third configuration ODA's short side from being located in the same horizontal direction as the Gate signal line of the display device. Although the chevron shape is used as an example in the embodiment of FIGS. 12A to 12F, it can be applied to third configuration ODAs with various geometric shapes, such as parallelograms, X types, or V types.

Figure 15:
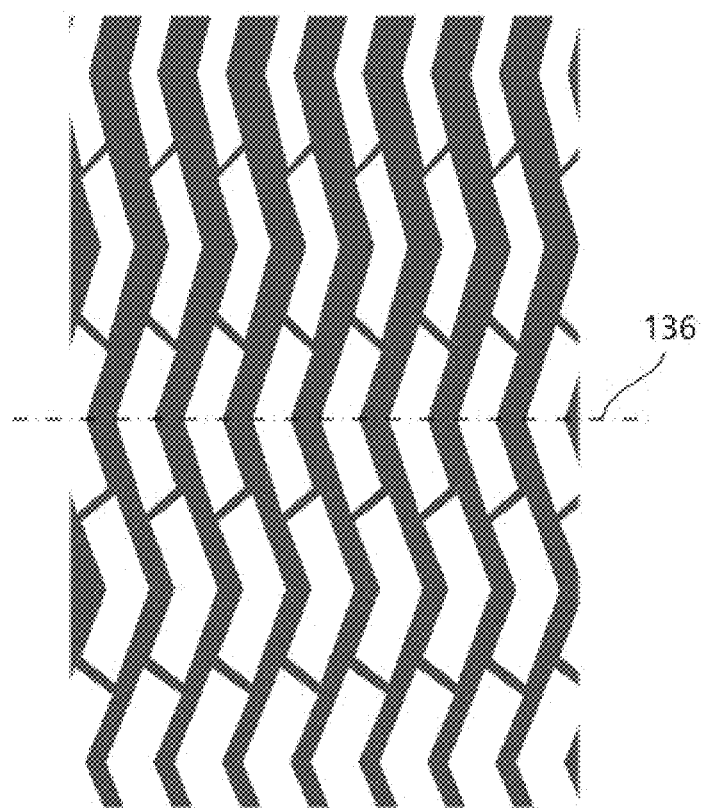
FIG. 15 is an embodiment of the present invention where the short side of the chevron is formed as a single diagonal.
Figure 16:
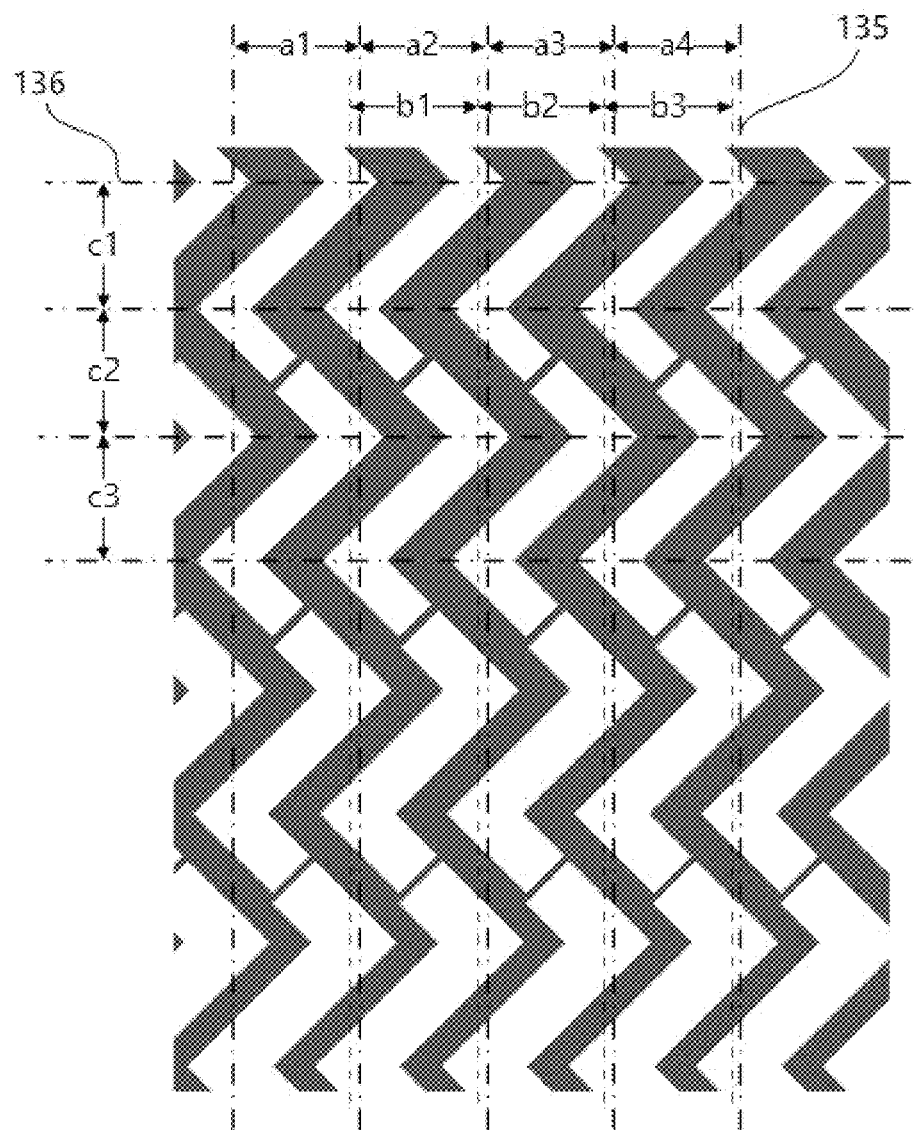
FIG. 16 is an embodiment of the present invention where the "Z" Type shape is used as the Third Configuration ODA.

Whether the shape of the short side of the third configuration ODA is formed as a single diagonal, as in the embodiments of FIGS. 15 to 16, or as two diagonals, as in FIGS. 12A to 12E, or as multiple diagonals, as in FIG. 12F, is related to the size of the Sub Pixel. Therefore, it is desirable to secure an appropriate method through simulation or matching in actual products.

Meanwhile, referring to FIG. 12 or FIG. 13 of Cited Invention 1, it can be seen that the long side of the inequality micro-pattern is formed diagonally, but the short side is formed in a straight line. The chevron pattern of the present invention is substantially similar in structure to the inequality micro-pattern of Cited Invention 1. However, the chevron type of the present invention, which applies diagonals to both the long and short sides to avoid moiré phenomena, can be seen as a more advanced structure compared to the embodiment of FIG. 1.

FIG. 13 is an embodiment of the present invention concerning the third configuration ODA used in the SLH bundle of ODA signal lines. In FIG. 13, the dark gray represents the ODA signal line 200 that constitutes the SLH and is made of a conductor, while the white represents the third configuration ODA from which the conductor has been removed.

Referring to FIG. 13, the ODA signal line 200 has multiple inflection points and is electrically insulated by the third configuration ODAs connected continuously up and down. Referring to the embodiment of FIG. 1, to the right of the Row4 ODA signal line, there will be the signal line of Row3 ODA, and to the left of the Row4 ODA signal line, there will be the signal line of Row5 ODA.

Referring to FIG. 2, the starting point of the ODA signal line 200 is placed to face the second configuration ODA that constitutes the neighboring ODA in some areas. At this time, it is desirable for the pitch of the vertical centerline 135 and the horizontal centerline 136 of the third configuration ODA that constitutes the ODA signal line 200 to maintain the same pitch applied to the half-wing of the neighboring ODA.

The ODA signal line 200 does not detect touch, so the size of the third configuration ODA that constitutes the ODA signal line 200 can be uniformly designed. It is also desirable to maintain an area similar or equivalent to the surrounding third configuration ODA to prevent visibility issues caused by differences in the area of the third configuration ODA.

The line resistance of the ODA signal line connecting far distant ODAs is proportional to the length of the signal line and inversely proportional to the width of the line resistance. Therefore, there are cases where the width of the signal line is designed broader to reduce the size of the line resistance. In the embodiment of FIG. 13, the signal line 200 of the Row2 ODA is located at a far distance, so the width of the signal line was increased to reduce the line resistance of the ODA signal line 200. If only the width of the signal line is increased, a difference in transmittance may occur due to the density difference of the third configuration ODA per unit area, which could lead to visibility issues where the ODA signal line 200 of the Row2 ODA is recognized. To solve this problem, dummy third configuration ODAs are arranged on the ODA signal line of the Row2 ODA to have a density similar to the surrounding third configuration ODAs. "Similar density" means that the pitch size of the longitudinal centerline 135 of the dummy third configuration ODA is the same as the pitch size of the neighboring longitudinal centerline 135. Unlike the neighboring third configuration ODAs that are continuously connected to electrically isolate the ODA signal line, the dummy third configuration ODAs need to electrically connect the ODA signal line 200 on which they are placed, so they are separated and stacked vertically.

If the second configuration ODA is used interchangeably with the third configuration ODA, which has a reversed phase as in the embodiment of FIG. 8, the ODA signal line is also used interchangeably with the third configuration ODA with a reversed phase and is arranged to match the neighboring second configuration ODA.

Thus, this invention uses the third configuration ODA, which is continuously connected for electrical insulation in the SLH bundle of the ODA signal line, and dummy third configuration ODAs can be placed between the continuously connected third configuration ODAs. At this time, the pitch of the longitudinal centerline 135 of the dummy third configuration ODA and the neighboring third configuration ODA should have the same size as the pitch of the longitudinal centerline 135 of the third configuration ODA that constitutes the neighboring second configuration ODA. Also, it's beneficial for the third configuration ODA and the dummy third configuration ODA to have the same outline to avoid visibility issues.

Figure 14:
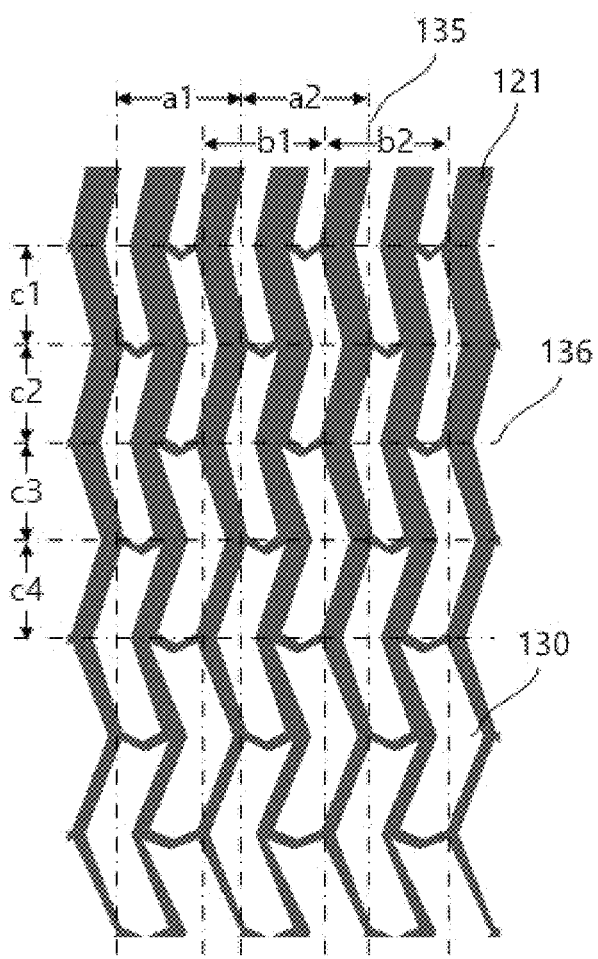
FIG. 14 is an embodiment of the present invention in which the Third Configuration ODA is composed of a combination of the leftward chevron and the rightward chevron.

FIG. 14 is an embodiment of the present invention in which the third configuration ODA is composed of a combination of leftward chevrons and rightward chevrons. FIG. 14 is a part of the second configuration ODA 121 that constitutes the first configuration ODA, and the second configuration ODA is composed of multiple third configuration ODAs with a chevron shape. The third configuration ODA 130 of FIG. 14 has diagonals applied to both the long and short sides to avoid moiré, showing superior moiré avoidance characteristics compared to the embodiment of Cited Invention 1, where only the long side has a diagonal. Also, the leftward chevron and rightward chevron are used interchangeably with a 180-degree phase difference, causing the conductive material between the short sides to be separated into two rows. Consequently, the situations where the conductive material between the short sides aligns parallel to the Gate Signal Line 12 are reduced by half, exhibiting superior moiré avoidance characteristics.

The pitch sizes a1 and a2 of the longitudinal centerline 135 passing through the center of the leftward chevron are the same, and the pitch sizes b1 and b2 of the longitudinal centerline 135 passing through the center of the rightward chevron are also the same. Preferably, the sizes of a1 and b1 are also the same. Also, the pitch sizes c1 to c4 of the transverse centerline 136 passing through the horizontal center of the leftward chevron and rightward chevron are the same.

FIG. 15 is an embodiment of the present invention where the short side of the chevron is composed of a single diagonal. In the embodiment of FIG. 14, the leftward chevron and rightward chevron have a 180-degree phase difference and are used interchangeably in different columns. However, in the embodiment of FIG. 15, the leftward chevron and rightward chevron are used together in the same column. The short side of the chevron is designed diagonally at a certain angle to the horizontal direction, and it's desirable for the diagonals of the upper and lower short sides of the chevron to be constructed at the same angle size based on the transverse centerline 136. For example, if the angle of the upper short side diagonal is 30 degrees, the angle of the lower short side is −30 degrees. Also, the virtual longitudinal centerlines passing through the center points of all leftward chevrons and all rightward chevrons intersect them. Similarly, as in FIG. 14, the pitch sizes of the virtual longitudinal centerlines connecting the center points of the leftward chevrons are the same, and the pitch sizes of the virtual longitudinal centerlines connecting the center points of the rightward chevrons are also the same.

In the embodiment of FIG. 15, within a single ODA column, the leftward chevron and rightward chevron are stacked vertically in succession, and a single diagonal is used on the short side. However, the diagonal of the short side can be composed of a compound diagonal with two diagonals and one inflection point, as in the embodiment of FIGS. 12A to 12F, or a compound diagonal with two or more inflection points. It's preferable to select in a direction that minimizes moiré in accordance with the display device 10.

FIG. 16 is an embodiment of the present invention where the "Z" Type is used as the third configuration ODA. When the pixel structure is a stripe structure, as in the embodiment of FIG. 11, the chevron type is often used as the third configuration ODA. However, when the pixel structure is a delta structure, the Z-shaped third configuration ODA, composed of three diagonals and two inflection points, can be more effective against moiré. Since the sub-pixels of R/G/B are positioned in a triangular shape in the delta structure, more curvature might be required than the chevron shape. Moreover, in the stripe structure of pixel arrangement, the Z type, by adjusting the angle and length of the diagonal, can be more effective in preventing moiré than the chevron structure. In FIG. 15, it's preferable for the lengths a1 to a4 of the longitudinal centerline 135 passing through the center of the leftward shape of the Z type to be the same. Also, the lengths b1 to b3 of the longitudinal centerline 135 passing through the center of the rightward shape of the Z type should preferably be the same, and the lengths of a1 and b1 can be the same or different. Additionally, the lengths c1 to c3 of the transverse centerline 136 passing through the two inflection points of the Z type should preferably be the same. In FIG. 16, the top and bottom diagonal parts of the Z shape are composed of a single diagonal, but it's also possible to be composed of multiple compound diagonals, as in the embodiment of FIGS. 12A to 12F. Also, it's preferable for the angles of the top and bottom diagonals to be the same.

Figure 17A:
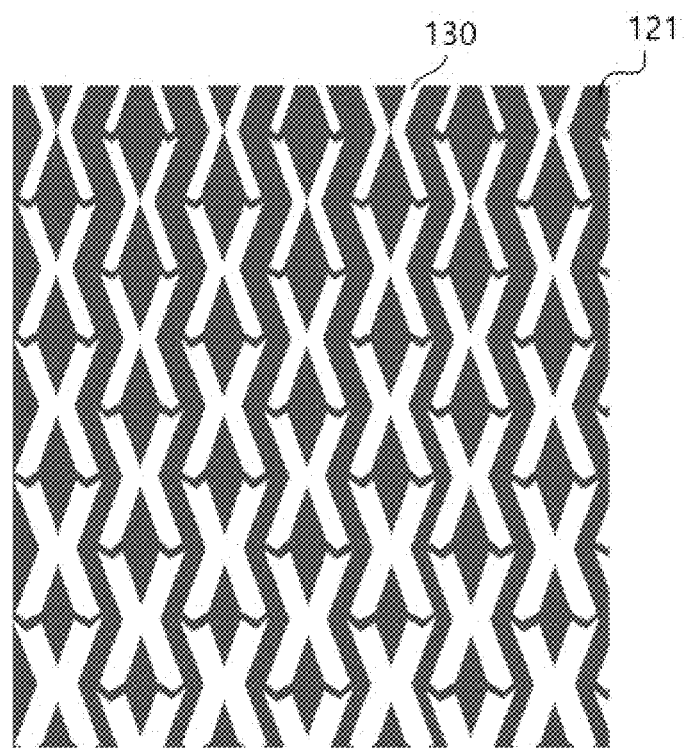
FIGS. 17A and 17B are embodiments of the present invention where the "X" Type shape is used as the Third Configuration ODA."
Figure 17B:
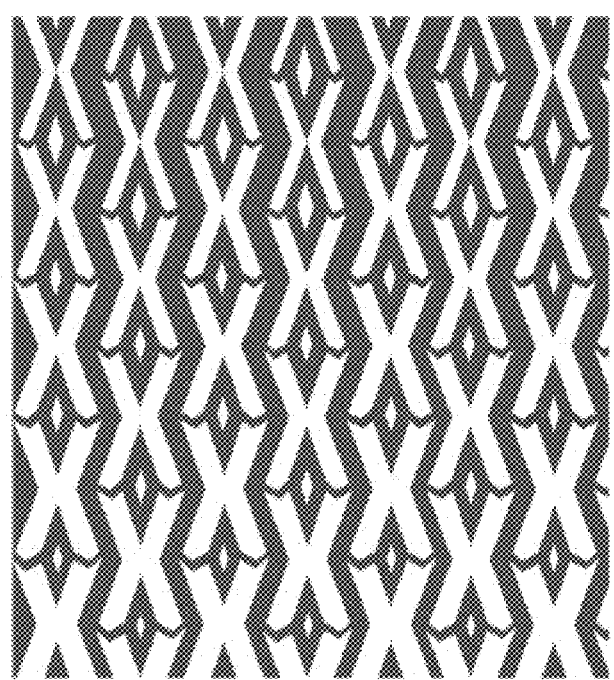

FIGS. 17A and 17B are embodiments of the present invention where the "X" Type is used as the third configuration ODA, referencing a part of the second configuration ODA 121 composed of the third configuration ODA 130 of the X type. Referring to FIGS. 17A and 17B, the third configuration ODA of the X type, where the conductive material is removed, is shown in white, and the dark gray represents the active area. The X type is composed of an upper V shape and a lower inverted V shape touching each other, and the waist of the X type is arranged facing the protruding part of the neighboring X. It's preferable for the angles between the upper V and the lower V to be the same. Since there's a diamond-shaped active area between the vertically stacked X types, as in FIG. 17A, to adjust the area of the active region, the conductive material can be removed in the shape of an isosceles rectangle or diamond, as in the embodiment of FIG. 17B. The short side is composed of a double diagonal, but it can also be composed of a single diagonal at a certain angle to the horizontal or of two or more compound diagonals. The pitch of the longitudinal centerline 135 passing through the center point of the left chevron part of the X type is the same, and the pitch of the longitudinal centerline 135 passing through the center point of the right chevron part is also the same, as explained in the embodiments of FIG. 14 or FIG. 16. Also, the pitch length of the transverse centerline passing through the waist of the X type should be the same, as explained in the embodiments of FIG. 14 or FIG. 16. The reason for the same longitudinal or transverse pitch is that the pixels constituting the display device are arranged regularly, and the arrangement of the third configuration ODA is determined corresponding to the pixels, so the third configuration ODA should also be arranged regularly.

According to an embodiment of the present invention, there's a benefit of improved object location detection resolution and enhanced linearity as even minute position changes of the pen result in corresponding minute area changes in the ODA. Additionally, it's possible to detect the touch position of the pen at high resolution without increasing the number of ODAs, reducing the area of the Touch IC and enabling cost savings. The invention also improves visibility issues caused by the moiré phenomenon, enhancing product quality. Moreover, by configuring the area of the second configuration ODA in relation to the diameter of the pen tip, detection errors due to abnormal coordinates are prevented. The effects of the invention are not limited to the above and should be understood to include all effects inferable from the detailed description or the scope of the claims of the invention.

The above description of the present invention is for illustrative purposes. Those skilled in the art will understand that the invention can be easily modified into other specific forms without changing the technical spirit or essential features of the present invention. Therefore, the embodiments described above should be understood as illustrative in all respects and not restrictive. The scope of the invention is defined by the appended claims, and all changes or modifications derived from the meaning and scope of the claims and their equivalents should be interpreted as being included within the scope of the invention.

DETAILED DESCRIPTION OF MAIN ELEMENTS

10: Display Device
11: Source Signal Line
12: Gate Signal Line
20: Object
100: Object Detection Area
101: Row3 ODA to Row6 ODA
102: Row4 ODA
110: First configuration ODA
121/122/123: Second configuration ODA
124: Second configuration ODA Link Area
125/126/127: Second configuration ODA
130: Third configuration ODA
135: Longitudinal centerline of the Third Configuration
136: Transverse centerline of the Third Configuration

What is claimed is:

1. An object location detection device comprising:
a first configuration Object Detection Area (ODA) installed on one side of a display device, composed of a transparent conductive material, connected on one side to an ODA signal line and not connected to another signal;
an ODA column consisting of a plurality of first configuration ODAs stacked together;
a plurality of ODA signal lines, each connected to the first configuration ODAs included in the ODA column;
the plurality of ODA signal lines, not connected to other signal lines, arranged in the same direction on one side of the ODA column, forming a Signal Line Harness (SLH);
a Touch IC that determines a presence of touch based on a voltage magnitude detected from the ODA signal line;
the ODA column where the number of the first configuration ODAs increases from a far distance to a near distance based on the Touch IC, the quantity of the ODA signal lines also increases, and an area of the first configuration ODA gradually decreases due to the increasing number of the first configuration ODAs;
a second configuration ODA link area located in the center of the first configuration ODA, composed of a transparent conductive material, and forming part of the first configuration ODA;
a plurality of second configuration ODAs, composed of a transparent conductive material with a predetermined area, are connected to the second configuration ODA link area, these second configuration ODAs are arranged in both the first and second directions based on the second configuration ODA link area and constitute the first configuration ODA;
an overlapping area formed between the first centerline of the first configuration ODA and a first centerline of a neighboring first configuration ODA, the plurality of second configuration ODAs, originating from the second configuration ODA link area that constitutes the first configuration ODA, are arranged in the first direction, the plurality of second configuration ODAs, originating from the second configuration ODA link area that constitutes the neighboring first configuration ODA, are arranged in the second direction, these second configuration ODAs are cross-arranged to form the overlapping area; and
centered around the second configuration ODA link area, three of the first configuration ODAs are spaced apart by a specific distance to form inter-line capacitance, when an nth signal line in the ODA column is selected as a sensing signal line, either (n−1) or (n+1), or both (n−1) and (n+1) ODA signal lines in the same ODA column are selected as driving signal lines, a driving voltage is then applied to the selected driving signal line to detect the object capacitance added to the sensing ODA connected to the sensing signal line.

2. The object location detection device of claim 1, wherein:
the voltage detected from the nth sensing signal line when no object capacitance is added to the sensing ODA connected to the nth sensing signal line is determined by [Equation 1], and the voltage detected from the nth sensing signal line due to an object capacitance Cobj added to the sensing ODA is determined by [Equation 2], wherein the presence of touch and touch coordinates are extracted based on the result of [Equation 1]-[Equation 2], $$Vp2 - Vp1 = \frac{(Vd2 - Vd1)*Cd}{Cd + Cprs + Ccm} \quad \text{[Equation 1]}$$

$$Vp2 - Vp1 = \frac{(Vd2 - Vd1)*Cd}{Cd + Cprs + Ccm + Cobj} \quad \text{[Equation 2]}$$

wherein,
a) Cd is the inter-line capacitance formed between the sensing ODA and the driving ODA,
b) Ccm is a common electrode capacitance formed by the sensing ODA facing the common electrode of the display device,
c) Cprs is a parasitic capacitance formed on the sensing ODA signal line,
d) Vp1 is the voltage detected from the sensing ODA when a driving voltage Vd1 is applied to the driving ODA,
e) Vp2 is the voltage detected from the sensing ODA when a driving voltage Vd2 is applied to the driving ODA.

3. The object location detection device of claim 1, wherein:
the second configuration ODA is characterized by being an isosceles rectangle or an isosceles triangle.

4. The object location detection device of claim 1, further comprising:
a third configuration ODA, which has a smaller area than the second configuration ODA and the conductive material is removed, is characterized by being arranged either inside or outline of the second configuration ODA in an up, down, left, or right direction.

5. The object location detection device of claim 4, wherein:
the center points of vertically arranged third configuration ODAs pass through a virtual first longitudinal centerline, and the center points of horizontally arranged third configuration ODAs pass through a virtual first transverse centerline, where intervals between a plurality of neighboring longitudinal centerlines are same, and the intervals between neighboring transverse centerlines are also same.

6. The object location detection device of claim 5, wherein:
for the first direction second configuration ODA and the second direction second configuration ODA that face each other in the overlapping area from different first configuration ODAs, an average area of an effective region composed of a conductive material of a third configuration ODA row that constitutes the first direction second configuration ODA and the third configuration ODA row of the same row that constitutes the second direction second configuration ODA is the same regardless of position of the third configuration ODA row.

7. The object location detection device of claim 5, wherein:
the third configuration ODA constituting the second configuration ODA is used for the ODA signal line connected to one side of the second configuration ODA, and the pitch of the virtual longitudinal centerline and transverse centerline of the third configuration ODA used for the ODA signal line is the same as the pitch of the longitudinal centerline and transverse centerline of the third configuration ODA belonging to the neighboring second configuration ODA.

8. The object location detection device of claim 4, wherein:
the plurality of third configuration ODAs arranged left and right constitute a third configuration ODA row, and when the second configuration ODA is composed of a plurality of such third configuration ODA rows arranged vertically, the areas of the plurality of third configuration ODAs that constitute a certain third configuration ODA row are of the same size.

9. The object location detection device of claim 4, wherein:
the plurality of third configuration ODAs arranged left and right constitute a third configuration ODA row, and when the second configuration ODA is composed of a plurality of such third configuration ODA rows arranged vertically, the area of the third configuration ODA varies between different third configuration ODA rows, and when the vertical position of the third configuration ODA row changes, the area of the third configuration ODA increases or decreases at a certain consistent ratio.

10. The object location detection device of claim 9, wherein:
The increase or decrease in the area of the third configuration ODA is characterized by symmetrically changing at the same ratio to the left and right of a virtual longitudinal centerline passing through the center point of the third configuration ODA.

11. The object location detection device of claim 4, wherein:
the long side and/or short side forming the outline of the third configuration ODA is configured to have a certain angle with the source signal line and/or gate signal line of the display device.

12. The object location detection device of claim 11, wherein:
the third configuration ODA is one or a combination of a rectangle, diamond, leftward chevron, rightward chevron, a line with a certain angle, or shapes like X, Z, or V.

13. The object location detection device of claim 12, wherein:
when one of the leftward or rightward chevrons forms a longitudinal column of the third configuration ODA by stacking vertically, and the other also forms a longitudinal column of the third configuration ODA by stacking vertically, the two different longitudinal columns of the third configuration ODA are placed adjacent to each other with a phase difference of 180 degrees.

14. The object location detection device of claim 12, wherein:
the leftward and rightward chevrons alternate and stack vertically to form a longitudinal column of the third configuration ODA, and a plurality of such longitudinal columns are successively arranged adjacent to each other.

15. The object location detection device of claim 12, wherein:
the short side of the rectangle, leftward chevron, rightward chevron, or the line with a certain angle, or shapes like X, Z, or V that constitute the third configuration ODA is configured to have a certain angle with respect to the transverse direction.

16. The object location detection device of claim 12, wherein:
the leftward or rightward chevron is composed of two diagonal lines that are symmetrical vertically, a virtual horizontal line passes through the junction where the two diagonal lines meet, based on this horizontal line, the angles of the diagonal lines above and below the junction are identical.

17. The object location detection device of claim 4, wherein:
the outline of the third configuration ODA, which constitutes one ODA column, is of the same shape.

18. The object location detection device of claim 1, wherein:
the plurality of second configuration ODAs constituting the first configuration ODA are arranged with a certain interval facing the second configuration ODA link area of the neighboring first configuration ODA, and this certain interval is applied identically to all the second configuration ODAs.

19. The object location detection device of claim 1, wherein:
different second configuration ODAs that constitute different first configuration ODAs and face each other in the overlapping area have a facing interval, this interval is an integer a plurality of, starting from 1, of the pitch of the short side of the neighboring third configuration ODA or the pitch between the longitudinal centerlines of the neighboring third configuration ODAs.

20. The object location detection device of claim 1, wherein:
the third configuration ODA connected continuously is used for the electrical insulation of the ODA signal lines constituting the SLH, and between the continuously connected third configuration ODAs, a Dummy third configuration ODA is arranged, the Dummy third configuration ODA is constructed with the same outline as the third configuration ODA and is stacked separately.

21. The object location detection device of claim 1, wherein:
one or a plurality of the third configuration ODA rows are installed at the Second configuration ODA Link Area, and the area of the third configuration ODA included in the third configuration ODA row has linearity that continues concerning the increase or decrease of the neighboring third configuration ODA.

22. The object location detection device of claim 1, wherein:
the number of third configuration ODA rows included in the second configuration ODA arranged in the first direction or the second direction is identical to the number of third configuration ODA rows included in the second configuration ODA arranged in the first direction or the second direction, which constitutes the neighboring first configuration ODA in the ODA column.

23. The object location detection device of claim 1, wherein:
the different second configuration ODAs cross-arranged in the overlapping area have the same area when calculated based on their outline.

24. An object location detection device comprising:
a first configuration Object Detection Area (ODA) installed on one side of a display device, composed of a transparent conductive material, connected on one side to an ODA signal line and not connected to another signal;
an ODA column consisting of a plurality of first configuration ODAs stacked together;
a plurality of ODA signal lines, each connected to the first configuration ODAs included in the ODA column;
the plurality of ODA signal lines, not connected to other signal lines, arranged in the same direction on one side of the ODA column, forming a Signal Line Harness (SLH);
a Touch IC that determines the presence of touch based on the voltage magnitude detected from the ODA signal line;
the ODA column where the number of said first configuration ODAs increases from a far distance to a near distance based on the Touch IC, the quantity of the ODA signal lines also increases, and the area of the first configuration ODA gradually decreases due to the increasing number of said first configuration ODAs;
a second configuration ODA link area located in the center of the said first configuration ODA, composed of a transparent conductive material, and forming part of the said first configuration ODA;
a plurality of second configuration ODAs, composed of a transparent conductive material with a predetermined area, are connected to the said second configuration ODA link area, these second configuration ODAs are arranged in both the first and second directions based on the second configuration ODA link area and constitute the said first configuration ODA;
the overlapping area is formed between the first centerline of the first configuration ODA and the first centerline of a neighboring first configuration ODA;
a plurality of second configuration ODAs, originating from the second configuration ODA link area that constitutes the first configuration ODA, are arranged in the first direction, a plurality of second configuration ODAs, originating from the second configuration ODA link area that constitutes the neighboring first configuration ODA, are arranged in the second direction, these said second configuration ODAs are cross-arranged to form the overlapping area; and
centered on the said second configuration ODA link area, three of the said first configuration ODAs are spaced apart specific distance to form inter-line capacitance;
when a touch pen, used as an input device, and a touch pen manufactured based on a predetermined specification output a certain magnitude of voltage and frequency, and when a signal from the pen is transmitted to a plurality of sensing ODAs selected from the said ODA column, the signal from the pen is detected from the sensing signal lines individually connected to the said a plurality of sensing ODAs.

* * * * *